US012684015B1

(12) United States Patent
Drieger et al.

(10) Patent No.: US 12,684,015 B1
(45) Date of Patent: Jul. 14, 2026

(54) SYSTEMS AND METHODS FOR DETECTING PHISHING EMAILS USING MACHINE LEARNING

(71) Applicant: Splunk Inc., San Francisco, CA (US)

(72) Inventors: Philipp Drieger, Munich (DE);
Tatsunobu Murata, Ichikawa (JP);
Namratha Sreekanta, Fremont, CA (US); Huaibo Zhao, Shinjuku-ku (JP)

(73) Assignee: Cisco Technology, Inc., San Jose, CA (US)

( * ) Notice: Subject to any disclaimer, the term of this patent is extended or adjusted under 35 U.S.C. 154(b) by 104 days.

(21) Appl. No.: 18/518,313

(22) Filed: Nov. 22, 2023

(51) Int. Cl.
*H04L 9/40* (2022.01)
*G06F 40/284* (2020.01)
(52) U.S. Cl.
CPC ........ *H04L 63/1483* (2013.01); *G06F 40/284* (2020.01)
(58) Field of Classification Search
None
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 11,444,978 B1 * | 9/2022 | Liao | G06F 40/30 |
| 11,757,816 B1 * | 9/2023 | Lin | H04L 63/12 |
| | | | 709/206 |
| 12,164,628 B2 * | 12/2024 | Khanna | G06Q 20/027 |

(Continued)

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

(Continued)

*Primary Examiner* — Khang Do
(74) *Attorney, Agent, or Firm* — Rutan & Tucker, LLP; Kyle M. St. James

(57) ABSTRACT

The disclosure provides for systems and methods directed to classifying emails as phishing or non-phishing through the use of machine learning. Preprocessing operations may be performed on the email that include removal of punctuation and changing all letters to lower case. Additionally, recipient and sender email addresses and a subject line may be concatenated to the text of the email body, which is then tokenized and provided to a machine learning model. In some implementations, the machine learning model may be constructed with a multi-layer transformer encoder architecture that includes a plurality of transformer blocks. The result of the machine learning model may include a contextualized embedding sequence. A set of linear layers may reduce the dimensionality of a first vector of the contextualized embedding sequence and an activation function may be applied thereto to determine a classification predication.

20 Claims, 17 Drawing Sheets

(56)                References Cited

U.S. PATENT DOCUMENTS

| | | | | |
|---|---|---|---|---|
| 2008/0091765 | A1* | 4/2008 | Gammage | G06T 7/40 709/202 |
| 2008/0304750 | A1* | 12/2008 | Kamei | G06V 10/7715 382/190 |
| 2019/0098106 | A1 | 3/2019 | Mungel et al. | |
| 2019/0319905 | A1* | 10/2019 | Baggett | H04L 51/212 |
| 2020/0366712 | A1* | 11/2020 | Onut | H04L 63/1483 |
| 2020/0372150 | A1* | 11/2020 | Salem | G06F 21/566 |
| 2021/0203690 | A1* | 7/2021 | Nunes | G06N 3/088 |
| 2021/0203692 | A1* | 7/2021 | Nunes | H04L 63/1483 |
| 2021/0240825 | A1* | 8/2021 | Kutt | G06F 21/563 |
| 2022/0094713 | A1* | 3/2022 | Lee | G06F 18/214 |
| 2022/0210188 | A1* | 6/2022 | Grewal | H04L 63/1483 |
| 2022/0279014 | A1* | 9/2022 | Stokes, III | G06F 21/56 |
| 2023/0038671 | A1* | 2/2023 | Weber | H04L 51/212 |
| 2023/0075964 | A1* | 3/2023 | Singh | G06N 3/045 |
| 2023/0171287 | A1* | 6/2023 | Slobodyanuk | H04L 51/212 726/23 |
| 2023/0188563 | A1* | 6/2023 | Sircar | H04L 63/1466 726/1 |
| 2023/0353595 | A1* | 11/2023 | Hu | G06N 3/045 |
| 2024/0056480 | A1* | 2/2024 | Onut | G06N 3/044 |
| 2024/0095356 | A1* | 3/2024 | Huang | G06F 21/56 |
| 2024/0154988 | A1* | 5/2024 | Yates | H04L 41/16 |
| 2024/0354403 | A1* | 10/2024 | Goutal | G06V 30/19 |
| 2025/0097237 | A1* | 3/2025 | Parla | H04L 63/1433 |
| 2025/0119452 | A1* | 4/2025 | Mon Divakaran | H04L 63/1483 |

OTHER PUBLICATIONS

Carraso, David, "Exploring Splunk," published by CITO Research, New York, NY, Apr. 2012.

Splunk Cloud 8.0.2004 User Manual, available online, retrieved May 20, 2020 from docs.splunk.com.

Splunk Enterprise 8.0.0 Overview, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

* cited by examiner

To: general@domain.com ——⟨ 502

From: Ulises@domain.com ——⟨ 504

Subject: Key Combination ——⟨ 506

> Hi! Is there a command to insert the signature using a combination of keys and not to have sent the mail to insert it then? I simply put it (them) into my (nmh) component files (components, replcomps, forwcomps and so on). That way you get them when you are editing your message. Also, by using comps files for specific folders you can alter your .sig per folder (and other tricks). See the docs for (n)mh for all the details. There might (must?) also be a way to get sedit to do it, but I've been using gvim as my exmh message editor for a long time now. I load it with a command that loads some email-specific settings, eg, to syntax colour-highlight the headers and quoted parts of an email... it would be possible to map some (vim) keys that would add a sig (or even give a selection of sigs to choose from). And there are all sorts of ways to have randomly-chosen sigs... somewhere at rtfm.mit.edu... ok, here we go: rtfm.mit.edu/pub/usenet-by-group/news.answers/signature_finger_faq. (Warning... it's old, May 1995). Regards, Ulises

508

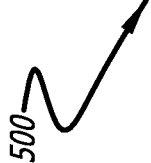

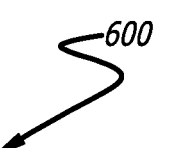

CONSTRUCT A PHISHING EMAIL DETECTION MODEL HAVING A MULTI-LAYER TRANSFORMER ENCODER ARCHITECTURE COMPRISED OF TWELVE TRANSFORMER BLOCKS, TWO LINEAR LAYERS TO REDUCE THE DIMENSIONALITY OF A CONTEXTUALIZED EMBEDDING VECTOR, AND AN ACTIVATION FUNCTION TO PRODUCE A CLASSIFICATION PREDICTION OF PHISHING OR NON-PHISHING 602

TUNE THE DETECTION MODEL ON TRAINING DATA WITH A PLURALITY OF EPOCHS WITH THE PARAMETERS OF THE DETECTION MODEL FROZEN EXCEPT FOR THE PARAMETERS OF THE LAST TRANSFORMER LAYERS 604

TOKENIZE THE TEXT OF AN EMAIL BODY CONCATENATED WITH THE RECIPIENT EMAIL ADDRESS, THE SENDER EMAIL ADDRESS AND THE SUBJECT LINE TO OBTAIN A TOKEN SEQUENCE 606

PROVIDE THE TOKEN SEQUENCE AS INPUT TO THE DETECTION MODEL, WHICH PROCESSES THE TOKEN SEQUENCE RESULTING IN A CONTEXTUALIZED EMBEDDING SEQUENCE 608

REDUCE THE DIMENSIONALITY OF A FIRST VECTOR OF THE CONTEXTUALIZED EMBEDDING SEQUENCE TO TWO DIMENSIONS USING A SET OF LINEAR LAYERS 610

APPLY AN ACTIVATION FUNCTION TO THE TWO-DIMENSIONAL OUTPUT OF THE LINEAR LAYERS TO YIELD THE CLASSIFICATION PREDICTION 612

*FIG. 7*

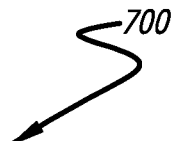

700

| OBTAIN AN EMAIL OBJECT AND EXTRACT PHISHING-RELATED FEATURES THEREFROM | 702 |

| TOKENIZE THE TEXT OF THE EMAIL BODY WITHOUT THE EXTRACTED PHISHING-RELATED FEATURES AND INCLUDING A RECIPIENT EMAIL ADDRESS, A SENDER EMAIL ADDRESS AND A SUBJECT LINE TO OBTAIN A TOKEN SEQUENCE | 704 |

| PROVIDE THE TOKEN SEQUENCE AS INPUT TO THE DETECTION MODEL, WHICH PROCESSES THE TOKEN SEQUENCE RESULTING IN A CONTEXTUALIZED EMBEDDING SEQUENCE | 706 |

| CONCATENATE THE PHISHING-RELATED FEATURES TO A FIRST VECTOR OF THE CONTEXTUALIZED EMBEDDING SEQUENCE | 708 |

| REDUCE THE DIMENSIONALITY OF THE CONTEXTUALIZED EMBEDDING SEQUENCE CONCATENATED WITH THE PHISHING-RELATED FEATURES TO TWO DIMENSIONS USING A SET OF LINEAR LAYERS | 710 |

| APPLY AN ACTIVATION FUNCTION TO THE TWO-DIMENSIONAL OUTPUT OF THE LINEAR LAYERS TO YIELD THE CLASSIFICATION PREDICTION | 712 |

FIG. 10

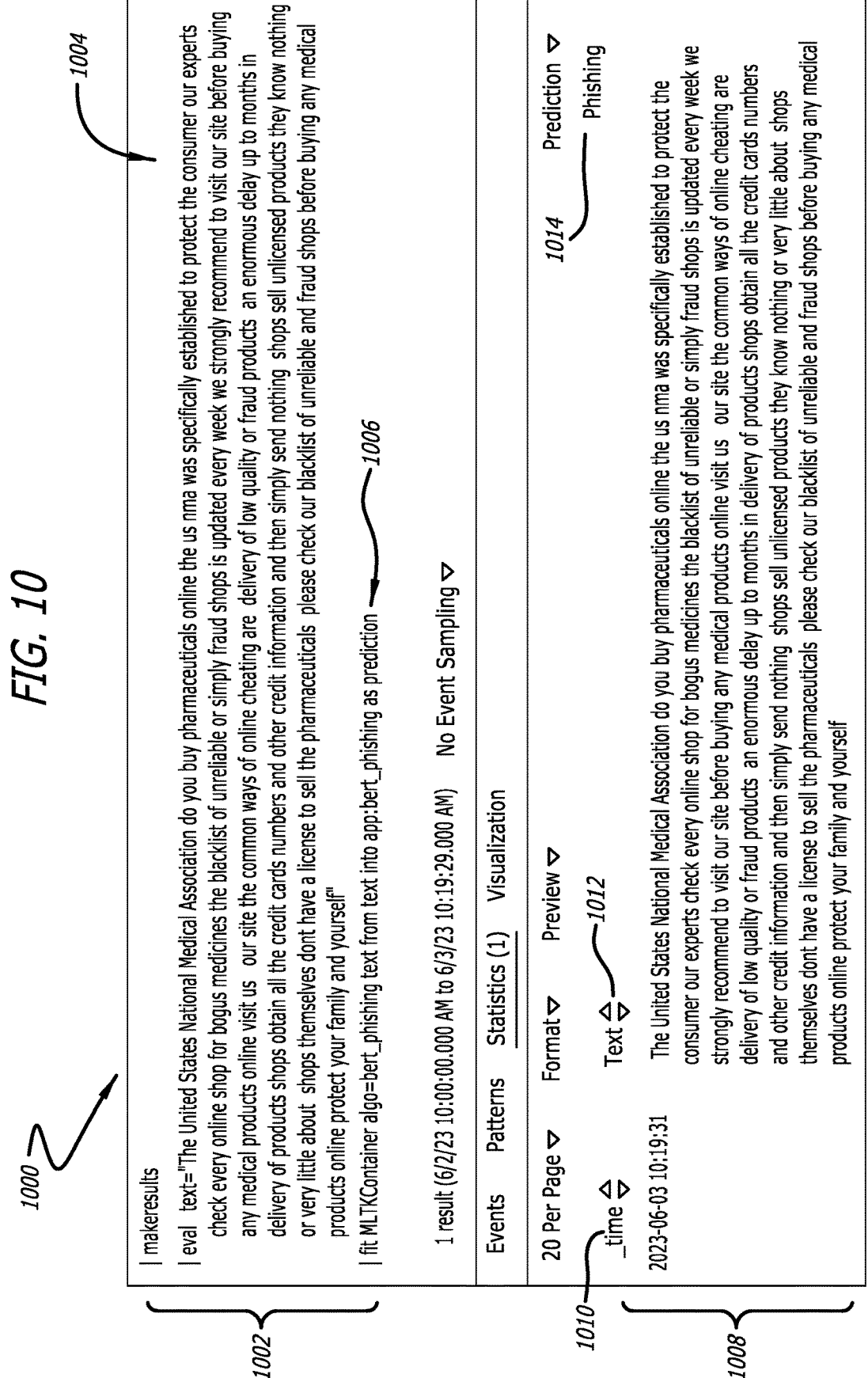

1000

1002

| makeresults

| eval text="The United States National Medical Association do you buy pharmaceuticals online the us nma was specifically established to protect the consumer our experts check every online shop for bogus medicines the blacklist of unreliable or simply fraud shops is updated every week we strongly recommend to visit our site before buying any medical products online visit us our site the common ways of online cheating are delivery of low quality or fraud products an enormous delay up to months in delivery of products shops obtain all the credit cards numbers and other credit information and then simply send nothing shops sell unlicensed products they know nothing or very little about shops themselves dont have a license to sell the pharmaceuticals please check our blacklist of unreliable and fraud shops before buying any medical products online protect your family and yourself"

| fit MLTKContainer algo=bert_phishing text from text into app:bert_phishing as prediction ⟶ 1006

1 result (6/2/23 10:00:00.000 AM to 6/3/23 10:19:29.000 AM)    No Event Sampling ▽

1004

Events    Patterns    Statistics (1)    Visualization

20 Per Page ▽    Format▽    Preview ▽

1010

1012

_time ◁▷    Text ◁▷

2023-06-03 10:19:31

The United States National Medical Association do you buy pharmaceuticals online the us nma was specifically established to protect the consumer our experts check every online shop for bogus medicines the blacklist of unreliable or simply fraud shops is updated every week we strongly recommend to visit our site before buying any medical products online visit us our site the common ways of online cheating are delivery of low quality or fraud products an enormous delay up to months in delivery of products shops obtain all the credit cards numbers and other credit information and then simply send nothing shops sell unlicensed products they know nothing or very little about shops themselves dont have a license to sell the pharmaceuticals please check our blacklist of unreliable and fraud shops before buying any medical products online protect your family and yourself

1008

1014    Prediction ▽

Phishing

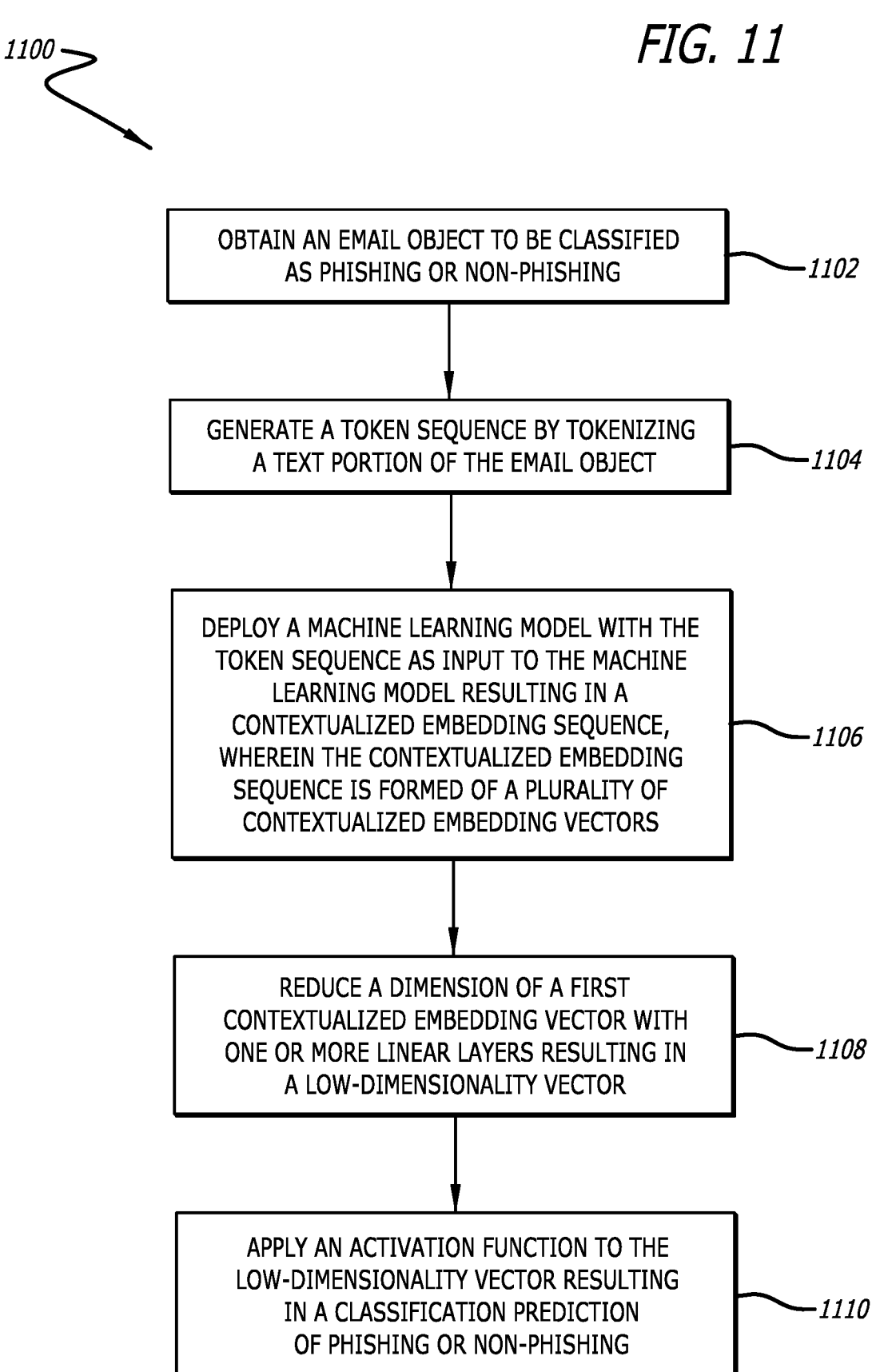

OBTAIN AN EMAIL OBJECT TO BE CLASSIFIED AS PHISHING OR NON-PHISHING ——1102

GENERATE A TOKEN SEQUENCE BY TOKENIZING A TEXT PORTION OF THE EMAIL OBJECT ——1104

DEPLOY A MACHINE LEARNING MODEL WITH THE TOKEN SEQUENCE AS INPUT TO THE MACHINE LEARNING MODEL RESULTING IN A CONTEXTUALIZED EMBEDDING SEQUENCE, WHEREIN THE CONTEXTUALIZED EMBEDDING SEQUENCE IS FORMED OF A PLURALITY OF CONTEXTUALIZED EMBEDDING VECTORS ——1106

REDUCE A DIMENSION OF A FIRST CONTEXTUALIZED EMBEDDING VECTOR WITH ONE OR MORE LINEAR LAYERS RESULTING IN A LOW-DIMENSIONALITY VECTOR ——1108

APPLY AN ACTIVATION FUNCTION TO THE LOW-DIMENSIONALITY VECTOR RESULTING IN A CLASSIFICATION PREDICTION OF PHISHING OR NON-PHISHING ——1110

1460

SYSTEMS AND METHODS FOR DETECTING PHISHING EMAILS USING MACHINE LEARNING

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Phishing emails are a type of cyberattack that involves fraudulent attempts to trick individuals or organizations into revealing sensitive information, such as login credentials, financial data, or personal information. These emails are typically designed to appear as though they are from a trusted source, such as a legitimate company, government agency, or financial institution. The goal of phishing emails is to manipulate the recipient into taking a specific action, often by clicking on a link or downloading an attachment, which can lead to various malicious activities, including identity theft, financial fraud, and the spread of malware.

BRIEF DESCRIPTION OF THE DRAWINGS

Illustrative examples are described in detail below with reference to the following figures:

FIG. 5A is a sample email on which a phishing analysis is to be performed according to an implementation of the disclosure.

FIG. 6 is a flowchart illustrating an example process of operations for performing a phishing analysis utilizing the deployment of FIG. 2A according to an implementation of the disclosure.

FIG. 7 is a flowchart illustrating an example process of operations for performing a phishing analysis utilizing the deployment of FIG. 2B according to an implementation of the disclosure.

FIG. 10 is a sample graphical user interface illustrating a sample pipelined search query that when executed initiates a phishing analysis on an email and the results of the phishing analysis according to an implementation of the disclosure.

FIG. 11 is a flowchart illustrating an example process of operations for determining whether an email is a phishing email according to an implementation of the disclosure.

DETAILED DESCRIPTION

Figure 1:
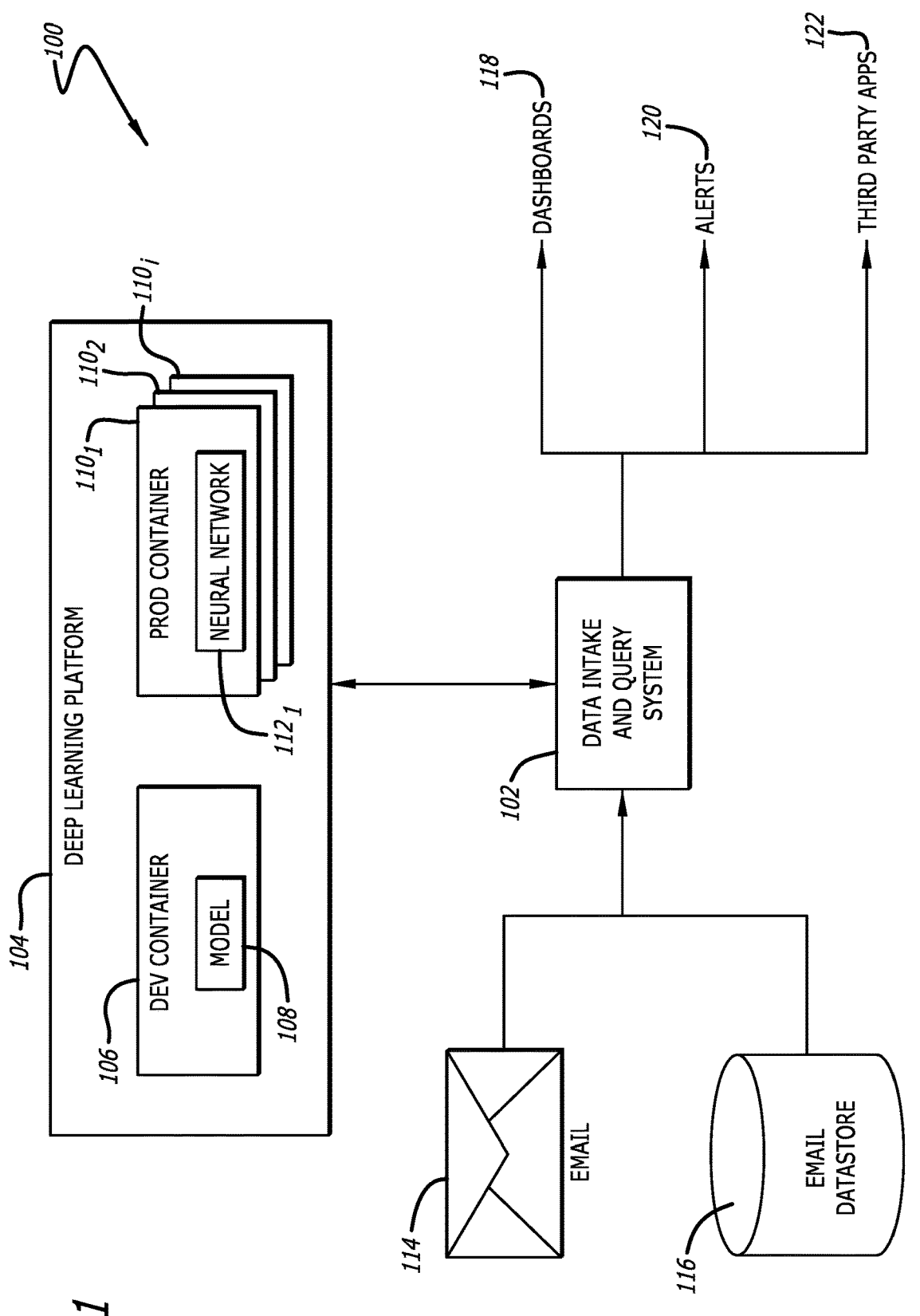
FIG. 1 is a block diagram illustrating a networked environment configured with network components and logic configured to obtain one or more emails, analyze the one or more emails, and determine whether the one or more emails are phishing emails according to an implementation of the disclosure.

As noted above, phishing emails are one form of cyber-attack where a bad actor attempts to trick individuals or organizations into revealing sensitive information such as login credentials, financial data, or personal or confidential information. There are current many methods that attempt to detect phishing emails including email filters, uniform resource locator (URL) analyses, allow/deny lists for email senders, and individual or organizational training.

Many email clients (e.g., software applications for sending/receiving emails) and enterprise organizations implement email filters configured to automatically detect suspicious emails such as phishing emails. Often, email filters look for suspicious patterns such predefined verbiage, wording that creates a sense of urgency or fear and compels a recipient to act quickly, or typographical errors or altered logos. URL analyses aim to detect links to imposter websites by analyzing the spelling of words within a URL located in the email body. Allow/deny lists are well-known and either allow emails from a first list of predefined senders (allow list) or deny emails from a second list of predefined senders (deny list). Additionally, many organizations routinely attempt to train individuals on phishing emails by requiring employees to watch videos or read materials on phishing and may even send out test emails to see if employees can identify the test emails as phishing emails.

Although the above referenced methods have some success, phishing emails have evolved from basic, easily identifiable emails having typographical errors or links to obviously fake or malicious websites into sophisticated, targeted email attacks. For instance, bad actors (or "cybercriminals") often use social engineering to personalize phishing emails to a particular recipient by providing personal information in an attempt to appear legitimate such as including names of other employees or a manager. As a result, the current solutions for detecting phishing emails need improvement in order to prevent against the loss of sensitive information to cybercriminals or other malicious actions such as the inadvertent downloading of attachments of documents stemming from a failure detect that a received email is a phishing attempt.

The disclosure provides for systems and methods that accurately classify emails as phishing or non-phishing through the use of machine learning. In some implementations, an email is obtained by a data intake and query system. The data intake and query system may perform preprocessing operations on the email and provide the preprocessed email to a software container within a deep learning platform. Alternatively, the email may be provided directly to the deep learning platform, which is configured to perform the preprocessing operations.

The software container within the deep learning platform, which may be operating on cloud computing resources, e.g., within a private cloud, may be configured to execute (deploy) a machine learning model that takes the preprocessed email as input and provides a classification prediction as to whether the email is a phishing or a non-phishing email. When the email is classified as phishing, the deep learning platform and/or the data intake query system may then implement certain remedial or preventive actions to guard against the loss of confidential data or other harmful acts or otherwise mitigate an ensuing cyberattack initiated by the phishing email. As will be discussed in further detail below, examples of machine learning models implemented by the software containers include random forest, logistic regression, long short-term memory (LSTM), transformer-based neural networks (e.g., based on bidirectional encoder representations from transformers (BERT), BERT with phishing-related feature inputs, DistilBERT, etc.), etc.

FIG. 1 is a block diagram illustrating a networked environment configured with network components and logic configured to obtain one or more emails, analyze the one or more emails, and determine whether the one or more emails are phishing emails according to an implementation of the disclosure. The networked environment 100 includes several components including hardware and software that are communicatively coupled through a network, namely the internet, which may be represented by the public cloud 306 and private cloud 308 in FIG. 3 or the public cloud 414 of FIG. 4. As illustrated, the networked environment 100 includes a data intake and query system 102 communicatively coupled to a deep learning platform 104, which may include multiple containers such as a DEV container 106 and a plurality of PROD containers $110_1$-$110_j$ (collectively or individually "110").

The term container may refer to a standalone, executable software package configured to run one or more applications. For example, the DEV container 106 may be a software package configured to run on cloud computing resources and perform machine learning model training. Additionally, the PROD containers 110 may be software packages configured to run on cloud computing resources and execute a machine learning model on input provided by the data intake and query system 102. For example and as discussed below, the data intake and query system 102 may provide aspects of emails 114 to a PROD container 110 that is configured to deploy a trained machine learning model resulting in a classification prediction (e.g., phishing or non-phishing) of the email 114. An example model may be the neural network $112_1$ of the PROD container $110_1$. Emails may also be stored in an email datastore 116 and provided to the data intake and query system 102 as a batch, e.g., multiple emails. For instance, the data intake and query system 102 may execute a query that causes performance of operations to retrieve one or more emails from the email datastore 116 and initiate, e.g., begin, a phishing analysis on the one or more emails, such as through deployment of a machine learning model by a PROD container 110.

The analyses performed by either the data intake and query system 102 or the deep learning platform 104 may result in certain actions performed automatically including generation and display of a dashboard 118, generation and display or transmission of alerts 120, and/or generation of instructions for or actions performed on behalf of third-party application 122 (e.g., an email client such as the email client OUTLOOK® provided by Microsoft Corporation).

Figure 2A:
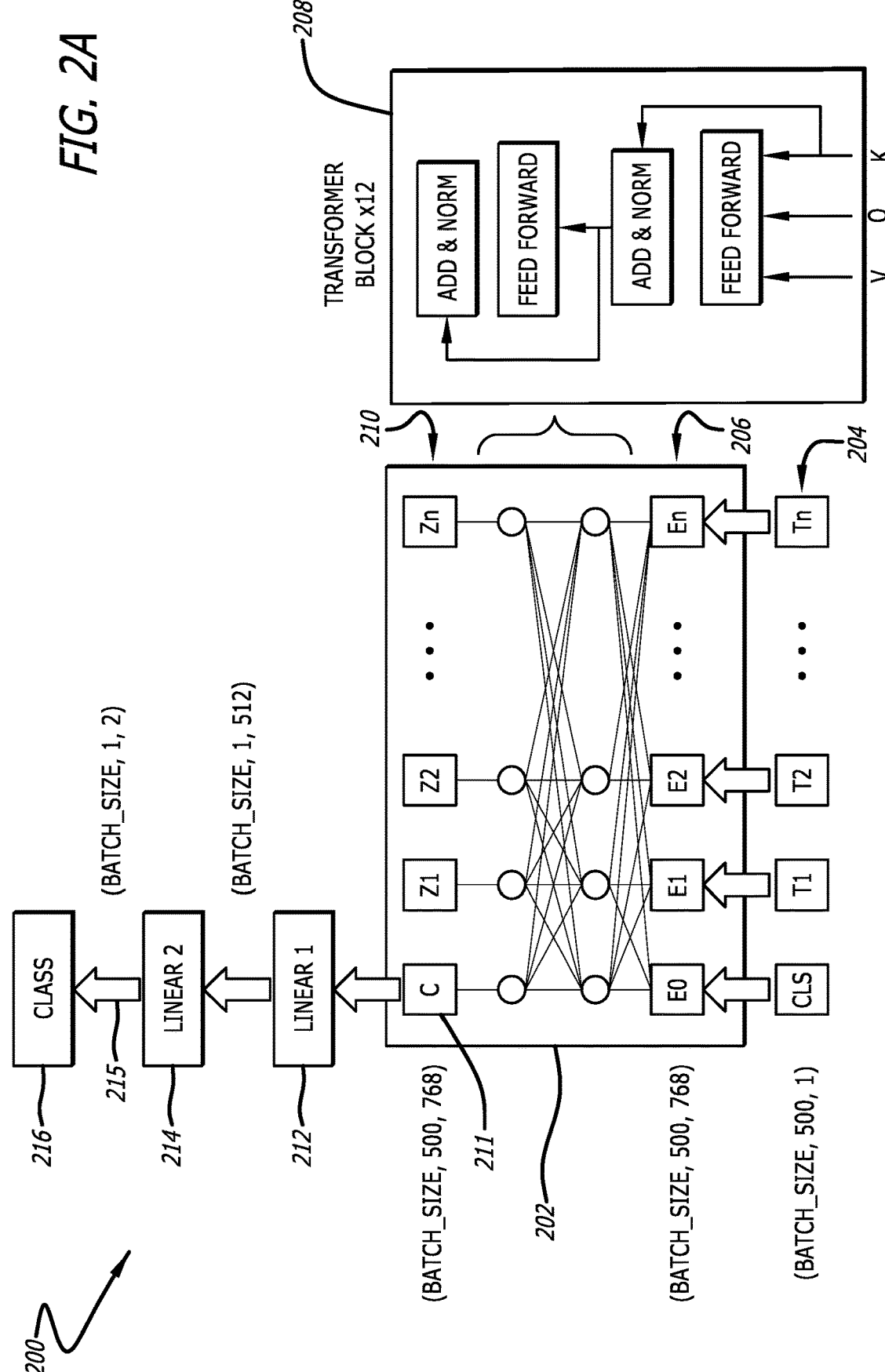
FIG. 2A is a block diagram illustrating detail of a first example deployment by the deep learning platform included within the networked environment of FIG. 1 according to an implementation of the disclosure.
Figure 2B:
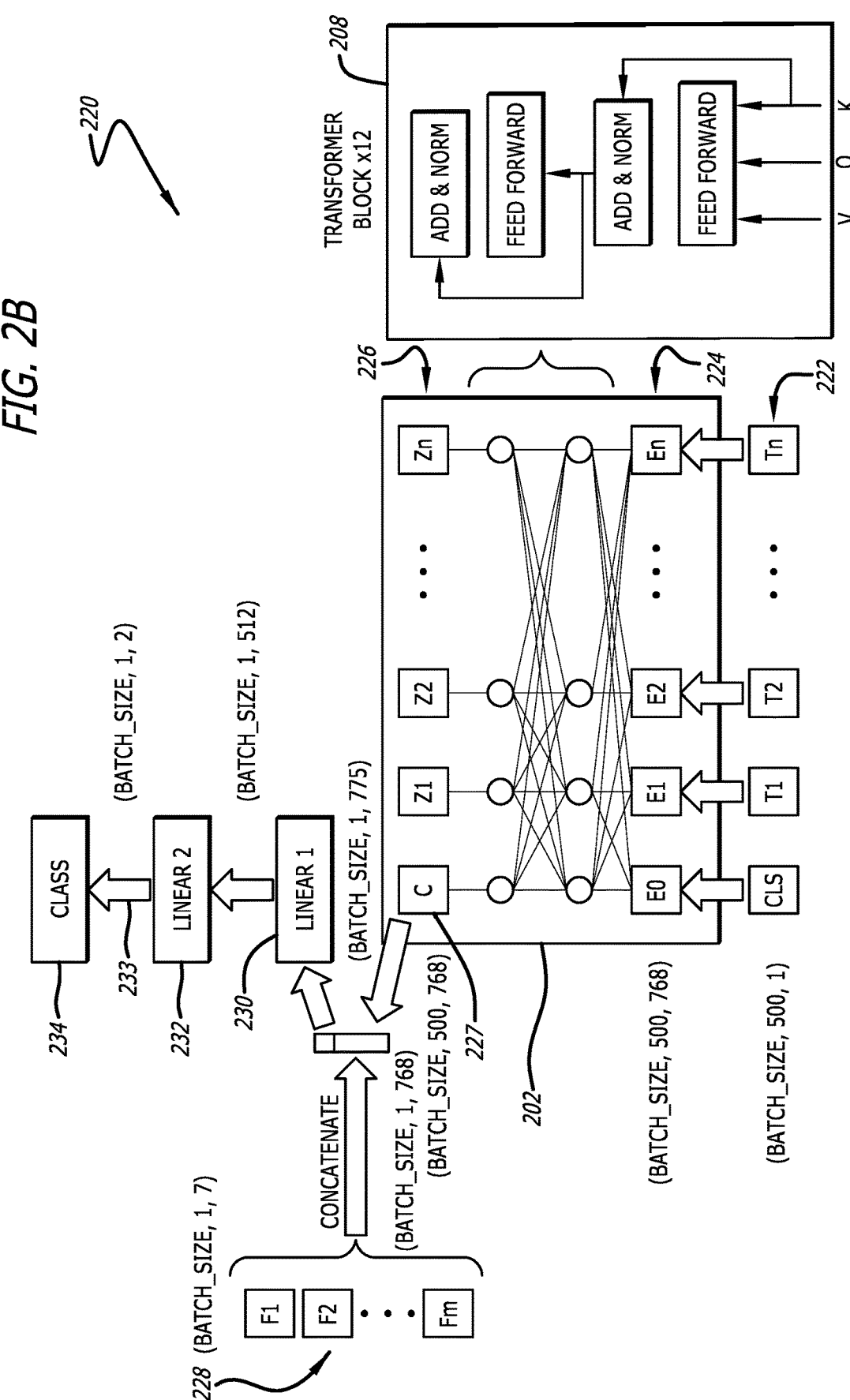
FIG. 2B is a block diagram illustrating detail of a second example deployment by the deep learning platform included within the networked environment of FIG. 1 according to an implementation of the disclosure.

FIGS. 2A-2B illustrate two examples of possible model deployments utilized by the deep learning platform 104. Specifically, FIGS. 2A-2B illustrate deployments that include an encoder model. The encoder model of FIG. 2A processes the text of an email body and information such as a recipient email address, a sender email address, and a subject line to classify an email as phishing or non-phishing. FIG. 2B illustrates a similar deployment utilizing an encoder but differently, extracts phishing-related features from processing by the encoder model, and concatenates these features to the result of the encoder model prior to application of a set of linear layers. However, the disclosure should not be limited to the two deployments illustrated in FIGS. 2A-2B. For example, the models 112 of the PROD containers 110 may also include other machine learning models such as logistic regression, long short-term memory (LSTM), random forest, DistilBERT, etc.

FIG. 2A is a block diagram illustrating detail of a first example model deployment of the deep learning platform included within the networked environment of FIG. 1 according to an implementation of the disclosure. The model deployment 200 illustrates a first example of utilizing an encoder model 202 to process an input sequence 204 resulting in a vector sequence 210 that captures the contextual information of the tokens forming the input sequence 204 as discussed below. The input sequence 204 is comprised of tokens (CLS, T1-Tn) representing the text body of an email. The vector sequence 210 includes a vector 211 (being illustrated as the left-most vector of the vector sequence 210 and labeled "C") in FIG. 2A, which is reduced from 768-dimensions to 2-dimensions through linear transformation performed by the linear layers 212, 214 resulting in the 2-dimensional vector 215.

Following the reduction in dimensions, an activation function 216 is applied to the 2-dimensional vector to compute the probability (likelihood) that the input sequence is phishing or non-phishing. The activation function 216 normalizes the numeric values of the 2-dimensional vector so that the two values sum to 1. In some implementations, the result of the activation function may be either (0,1) or (1,0), where (1,0) indicates the input sequence is classified as phishing and (0,1) indicates the input sequence is classified as non-phishing. In other implementations, the output may be some decimal representation summing to 1 in the form of (x, y), where the x represents the likelihood the input sequence is phishing and y represents the likelihood the input sequence is non-phishing. As one example, the activation function may be a softmax activation function.

In some implementations, the encoder model 202 transforms the input sequence 204, into a fixed-size representation (the vectors comprising the vector sequence 210) that captures the relevant information from the input. Stated differently, the encoder model 202 receives a tokenized version of the text of an email body to be classified as phishing or non-phishing and performs embedding and encoding operations on the tokens resulting in a fixed-size representation that is often referred to as a "context vector" or "an encoding" (e.g., the vector sequence 210). The encoding represents a summary of the relevant information from the tokenized text (the input sequence 204).

The encoder model 202 produces the encoding 210 by first receiving the input sequence 204, which is comprised of a sequence of tokens (e.g., words, subwords, or characters). In implementations discussed herein, the input sequence 204 represents the text of an email body to be classified as phishing or non-phishing. As noted below, some implementations concatenate information such as a recipient email address, a sender email address, and a subject line to the text of the email body.

The encoder model 202 transforms the tokens forming the input sequence 204 into the continuous vector representations 206 using an embedding layer that assigns each token a unique vector that captures its meaning or characteristics. As shown, the vectors E0-En (collectively 206) are illustrative of the continuous vector representations produced by an embedding layer of the model 202. In many implementations, the embedding layer performs two tasks. One task may be referred to as token embedding in which each input token is converted into a continuous vector representation. These token embeddings capture the meaning and characteristics of individual tokens. The encoder model may utilize a fixed-size vocabulary (e.g., approximately 30,000 words) with each token being associated with a unique embedding vector. During tokenizing of the text of the email body, original words may be broken down into multiple words or subwords due to the fixed-size vocabulary. As a result, original words that are not included in the fixed-size vocabulary are represented as subwords or individual characters. Additionally, the encoder model may also incorporate positional encodings into the embeddings that signify the position of the tokens within the input sequence. By combining token embeddings with positional encodings, the encoder model is able to understand both the meaning of individual tokens and their position in the input sequence, which enables the encoder model to capture contextual information and dependencies between tokens in a bidirectional manner.

Importantly, the encoder model 202 consists of multiple layers stacked on top of each other. The layers are represented by transformer blocks 208. The example shown in FIG. 2A includes twelve transformer blocks 208 or twelve layers. Each layer is responsible for processing the input sequence 204. In implementations discussed herein, the layers include self-attention mechanisms and feedforward neural networks. Self-attention mechanisms enable the encoder model 202 to weigh the importance of each token in the input sequence 204 during encoding thereby capturing dependencies and relationships between tokens. With respect to an individual layer, following processing by a self-attention mechanism, a feedforward neural network processes the token representations to further capture complex patterns and relationships within the input provided to the encoder model 202. The input of one layer is the output of the previous layer. As noted above, after passing through the layers of the encoder, the input sequence 204 is transformed into a fixed-size representation ("the encoding") 210 representing a summary of the relevant information from the input sequence 204.

Still referring to FIG. 2A, processing of the input sequence 204 by the encoder model 202 results in the encoding, represented as the vector sequence C, Z1-Zn (collectively vector sequence 210), with the vector C 211 representing the information of the vectors Z1-Zn. By fine-tuning the vector C 211, the input sequence 204, and thus the corresponding email, may be classified as phishing or non-phishing. In certain implementations, the fine-tuning may include processing by the two linear layers 212, 214 to project the high dimensionality of the vector C 211 (e.g., 768 dimensions) to lower dimensions. More specifically, a first linear layer 212 projects the 768 dimensions of the vector C to 512 dimensions and a second linear layer 214 projects the 512 dimensions to two dimensions. The resultant two dimensions, represented as either (0,1) or (1,0), indicate whether the input sequence is phishing or non-phishing. In some implementations, a two dimensional result of (1,0) indicates the input sequence is phishing and a two dimensional result of (0,1) indicates the input sequence is non-phishing.

Each of the linear layers 212, 214 projects a high-dimensional vector to a lower-dimensional vector by performing a linear transformation through matrix multiplication and an optional bias term. For example, projecting a 512-dimensional vector to a 2-dimensional vector would involve the following equation: $y = Wx + b$. In the equation, x denotes the 512-dimensional vector, W denotes a matrix of dimensions $(2 \times 512)$, b denotes the optional bias vector, and y denotes the 2-dimensional output vector. The elements of W are learned parameters and determine how each input dimension contributes to each output dimension. The optional bias vector b provides an offset or shift to the output values and allows the linear transformation to capture translations. Thus, the projection from the 768-dimensions of the vector C down to 2-dimensions performed by the two linear layers enables the determination of a classification prediction based on the processing by the encoder model.

In some implementations of the disclosure, the systems and methods utilize a Bidirectional Encoder Representations from Transformers (BERT) model. BERT is an encoder model that is bidirectional, meaning it is configured to consider both past and future tokens when encoding a given token, which improves the ability of the model to understand context more effectively.

FIG. 2B is a block diagram illustrating details of a second example deployment by the deep learning platform included within the networked environment of FIG. 1 according to an implementation of the disclosure. The model deployment 220 illustrates a second example of utilizing the encoder model 202 discussed in depth above. The model deployment 220 of FIG. 2B differs from the model deployment 200 of FIG. 2A in that the input sequence 222 has been processed to extract phishing-related features 228 as compared to the input sequence 224. Details as to the extraction of the phishing-related features 228 are discussed below with respect to at least FIGS. 7 and 9. Additionally, the model deployment 220 of FIG. 2B includes a step of concatenating the extracted phishing-related features 228 to the vector C 227 of the vector sequence 226, which increases the dimensionality of the vector C 227 from 768-dimensions to 775-dimensions (e.g., due to the addition of 8 phishing-related features 228) as the phishing-related features 228 are concatenated to the contextualized embedding vector, when the concatenated feature is processed by the linear layers, the phishing-related features 228 are put into consideration during model training and will affect the classification result. The first linear layer 230 operates to reduce the concatenated vector C 227 from 775-dimensions to 512-dimensions, and the second layer 232 operates to reduce the 512-dimensions to a 2-dimensional vector. Following the reduction in dimensions, an activation function 234 is applied to the 2-dimensional vector 233 to compute the probability (likelihood) that the input sequence is phishing or non-phishing. The activation function 234 normalizes the numeric values of the 2-dimensional vector 233 so that the two values sum to 1. In some implementations, the result of the activation function may be either (0,1) or (1,0), where (1,0) indicates the input sequence is classified as phishing and (0,1) indicates the input sequence is classified as non-phishing. In other implementations, the output may be some decimal representation summing to 1 in the form of (x,y), where the x represents the likelihood the input sequence is phishing and y represents the likelihood the input sequence is non-phishing. As one example, the activation function may be a softmax activation function.

Thus, the operability of the encoder model 202 discussed above with respect to FIG. 2A applies equally to the operability of the same in FIG. 2B. The difference in the deployments between FIGS. 2A-2B stems from the extraction of phishing-related features from the email object prior to analysis by the encoder model 202 and concatenation of the phishing-related features to the contextualized embedding vector C 227. The linear layers 230, 232 operate in a similar manner as the linear layers 212, 214 in FIG. 2A except that the first linear layer 230 in FIG. 2B reduces 775-dimensions to 512-dimensions instead of reducing 768-dimensions to 512-dimensions as in FIG. 2A. It should be noted that an alternative number of phishing-related features may be extracted so the 775-dimensions in FIG. 2B is merely illustrative.

As noted above, the model deployments of FIGS. 2A-2B are merely illustrative of possible deployments. Other models that may be deployed by the deep learning platform 104 referenced above include random forest, logistic regression, long short-term memory (LSTM), and DistilBERT. Random forest is a machine learning algorithm that combines multiple decision trees to make predictions by aggregating the results from each tree, resulting in a versatile and robust classifier capable of handling complex datasets. In order to input text into a random forest model, a tokenizer was created that converts text (e.g., of an email body) to a matrix of Term Frequency-Inverse Document Frequency (TF-IDF) features and the was then fitted on a training set. The tokenizer was configured to contain a vocabulary of 10,000 tokens (e.g., 1-gram, 2-gram and 3-gram tokens). The vocabulary was used as the feature set for the random forest model. One implementation of the random forest model included parameters of n_estimators=100 (e.g., 100 trees in the forest) and max_depth=50 (e.g., representing a maximum depth of a tree), which were selected based on experiential data. In examples where phishing-related features are extracted, the phishing-related features are directly concatenated to the sequence of features generated from the text tokenization.

Logistic regression used in text classification is a statistical model that learns the relationship between textual features and their corresponding labels resulting in a prediction of the probability of a specific class for a given text input. In some implementations, the tokenizer described above with respect to the random forest model may be utilized to tokenize input for a logistic regression model. As with the random forest model, in examples where phishing-related features are extracted, the phishing-related features are directly concatenated to the sequence of features generated from the text tokenization.

A LSTM model is a type of recurrent neural network (RNN) architecture that may be used for text classification. LSTM models may be configured to effectively capture and remember long-range dependencies in sequential data. In one implementation, a LSTM model was developed and configured for the phishing email detection that included an embedding layer, an LSTM layer and a dense layer. For tokenizing the text input, a tokenizer is fitted on a training set containing 10,000 tokens. In one example, the tokenizer may be a TENSORFLOW® tokenizer. Processing of the LSTM model deployment may include tokenizing the text of an email body concatenated with a recipient's email address, a sender's email address, and a subject line to generate a token sequence. In some examples, the tokenizing is capped at a length of 500 tokens. The token sequence is then converted by an embedding layer into an embedded sequence having 128-dimensions. The embedded sequence is further processed by an LSTM layer with 0.5 dropout. The output of the LSTM layer is then processed by a dense layer with one node. An activation function (e.g., a sigmoid activation function) is applied to the output of the dense layer to yield the output class prediction. The parameters including the number of LSTM layers and the inner dimension were decided based on experiential data.

In some implementations, phishing-related features may be extracted as discussed herein. In such an implementation, each of the phishing-related features is first processed by its own densely-connected layer with an ReLU activation function. The text of the email body having the phishing-related features extracted therefrom and concatenated with a recipient's email address, a sender's email address, and a subject line is tokenized, and processed by the embedding layer, LSTM layer, and dense layer as discussed above. The output of the LSTM model's dense layer and the outputs of each phishing-related feature's individual dense layer are concatenated and fed to another dense layer, the output of which is provided to an activation function to yield the output class prediction.

Figure 3:
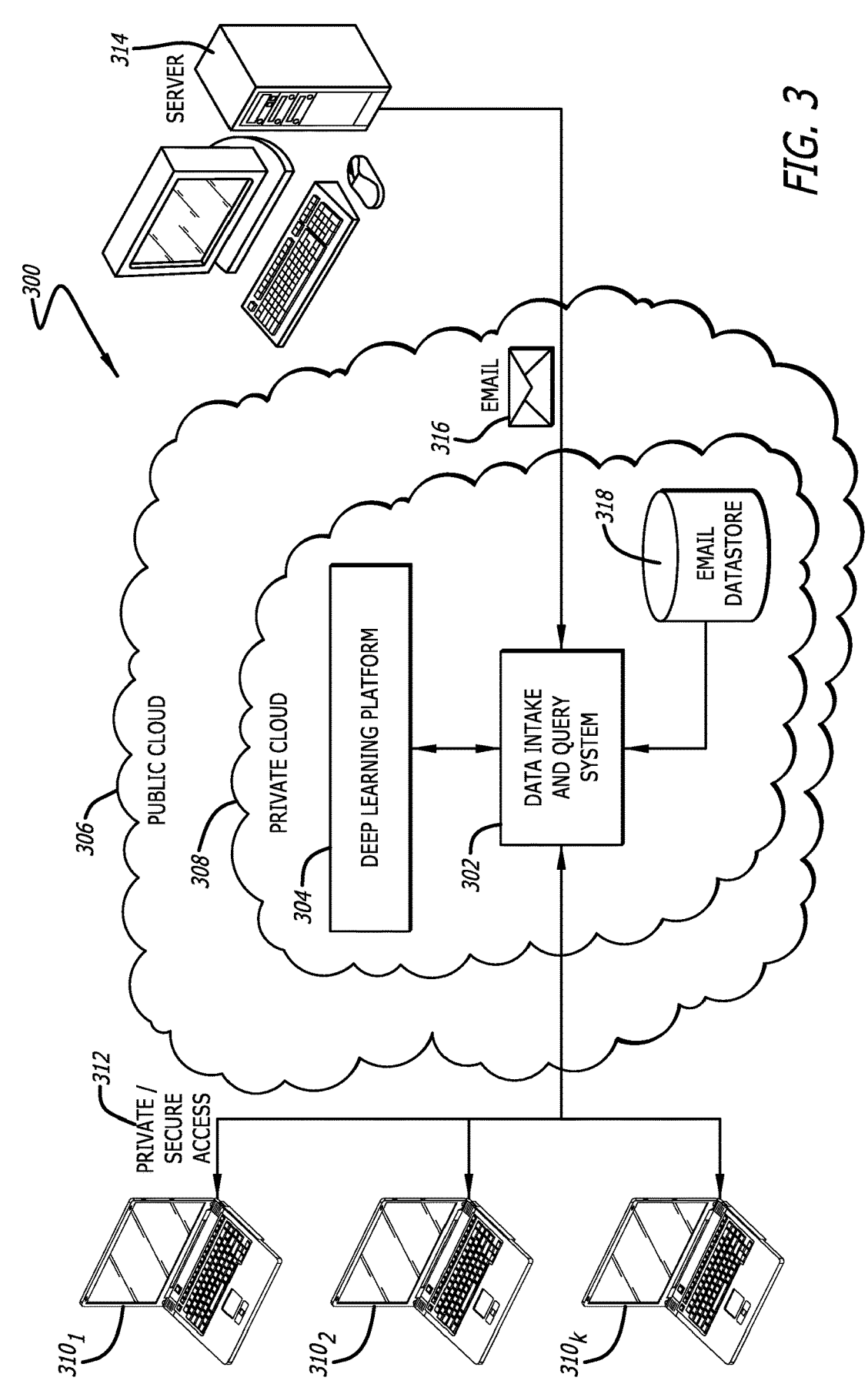
FIG. 3 is a block diagram illustrating a first sample configuration of the networked environment of FIG. 1 including network components disposed within a private cloud being a subportion of a public cloud according to an implementation of the disclosure.

FIG. 3 is a block diagram illustrating a first sample configuration of the networked environment of FIG. 1 including network components disposed within a private cloud being a subportion of a public cloud according to an implementation of the disclosure. The networked environment 300 includes many components of the networked environment 100, which are configured to operate in the same manner as discussed above with respect to FIGS. 1-2B. Additionally, FIG. 3 illustrates that the networked environment 300 may be configured such that the data intake and query system 302, the deep learning platform 304, and the email datastore 318 operate within a private cloud 308, which is a private (secure) portion of the public cloud 306 (internet and cloud computing resources accessible thereby). Specifically, FIG. 3 illustrates that a set of users, e.g., corresponding to network devices $310_1$-$310_k$ (collectively or individually "310"), may access the private cloud 308 via private, secure access 312. Such access may include exchanging of network traffic such as the email 316 sent by sender 314 that is located outside of the private, secure access 312.

FIG. 3 illustrates that the data intake and query system 302 and the deep learning platform 304 may operate on cloud computing resources within a private cloud 308 that is accessible by a set of network devices 310 via a private, secure access 312. The networked environment 300 may represent one enterprise configuration with the network devices 310 being those of enterprise employees and the sender 314 representing a cybercriminal that is attempting to carry out a cyberattack on the enterprise through the phishing email 316. Thus, the phishing email 316 directed to one or more of the users of the network devices 310 will be received by the data intake and query system 302 and provided to the deep learning platform 304, which performs a phishing analysis as discussed herein. For instance, a trained model within a PROD container of the deep learning platform 304 may be deployed on the email 316 such that the trained model provides a classification prediction of phishing or non-phishing. When the classification prediction is phishing, various remediation efforts or preventive actions may be automatically implemented to prevent or mitigate problems associated with the phishing attack. However, when the classification prediction of an email is non-phishing, the email is permitted to pass to the recipient's inbox.

Figure 4:
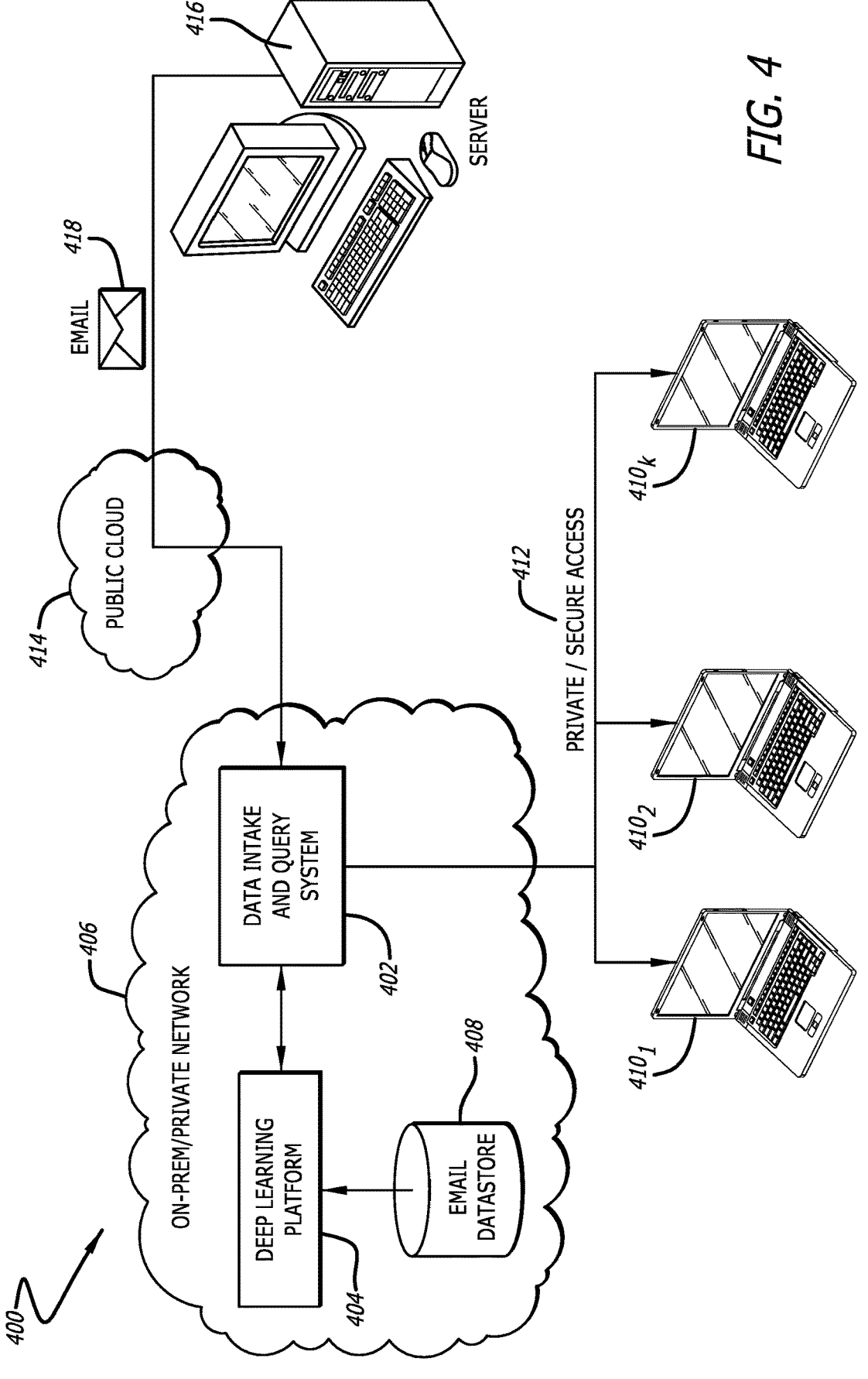
FIG. 4 is a block diagram illustrating a second sample configuration of the networked environment of FIG. 1 including network components disposed within an on-premise private cloud according to an implementation of the disclosure.

FIG. 4 is a block diagram illustrating a second sample configuration of the networked environment of FIG. 1 including network components disposed within an on-premise private cloud according to an implementation of the disclosure. The networked environment 400 includes many components of the networked environment 100, which are configured to operate in the same manner as discussed above with respect to FIGS. 1-2B. Additionally, FIG. 4 illustrates that the networked environment 400 may be configured such that the data intake and query system 402, the deep learning platform 404, and the email datastore 408 operate within an on-premise ("on-prem") private network 406, which may be located behind a set of network appliances such as a firewall (not shown) and separate from the public cloud (internet and public cloud computing resources) 414. Specifically, FIG. 4 illustrates that a set of users, e.g., corresponding to network devices $410_1$-$410_k$ (collectively or individually "410"), may access the on-prem, private network 406 via private, secure access, which occurs as a result of being behind a firewall. Additionally, external senders, such as the sender 416, may transmit an email 418 to any of recipients corresponding to the network devices 410 via the internet, where the email 418 is received by the data intake and query system 402 and provided to the deep learning platform 404.

FIG. 4 illustrates that the data intake and query system 402 and the deep learning platform 404 may operate on resources of an on-prem, private network 406 that is accessible by a set of network devices 410, which generally occurs through a private, secure access as a result of the on-prem, private network 406 and the network devices 410 operating behind a firewall (not shown), which separates the on-prem, private network 406 and network devices 410 from the public cloud 414. The networked environment 400 may represent an alternative enterprise configuration with respect to the networked environment 300. In particular, referring to the networked environment 400, the network devices 410 may be those of enterprise employees and the sender 416 may represent a cybercriminal that is attempting to carry out a cyberattack on the enterprise through the phishing email 418. Thus, the phishing email 418 directed to one or more of the users of the network devices 410 will be received by a network device 410 or the data intake and query system 402 depending on implementation details. The email 418 is then provided to the deep learning platform 404, which performs a phishing analysis as discussed herein. For instance, a trained model within a PROD container of the deep learning platform 404 may be deployed on the email 418 such that the trained model provides a classification prediction of phishing or non-phishing. When the classification prediction is phishing, various remediation efforts or preventive actions may be automatically implemented to prevent or mitigate problems associated with the phishing attack. However, when the classification prediction of an email is non-phishing, the email is returned to the recipient's inbox or permitted to pass to the recipient's inbox depending on the implementation, examples of which are discussed below.

In some implementations, a network appliance such as a firewall, an intrusion detection system (IDS), or an intrusion prevention system (IPS) may intercept the email 418 prior to the email 418 being delivered to the recipient. The intercepted email 418 may be provided to the data intake and query system 402 or deposited into the email datastore 408 for subsequent retrieval by the data intake and query system 402. For example, the emails deposited in the email datastore 408 may be retrieved at regular intervals for automated batch processing such that the emails within a particular batch are analyzed by data intake and query system 402 and the deep learning platform 404 in response to execution of a search query (e.g., pipelined search query). FIG. 10 provides an illustrative example of a sample search query and predicted classification result.

In other implementations, the email 418 is received by a recipient utilizing any of the network devices 410. The recipient may mark or flag the email 418 as being suspicious or otherwise potential spam or phishing. As a result, the email 418 may be deposited in the email datastore 408 such that the data intake and query system 402 may retrieve the email 418, either individually or as part of a batch query, and perform a phishing analysis on the email 418 in combination with the deep learning platform 404 as described herein. The discussion pertaining to interception and retrieval of emails for analysis is equally applicable to the networked environment 300 of FIG. 3.

FIG. 5A is a sample email on which a phishing analysis is to be performed according to an implementation of the disclosure. The sample email 500 may be representative of either the email 316, 418 of FIGS. 3-4. The email 500 includes a header portion formed of a recipient email address 502, a sender email address 504, and a subject line 506. Further, the email 500 includes a body 508. As shown, the body 508 includes punctuation, a URL, numbers, and both upper and lower case letters. The email 500 may be one such email that is a candidate on which a phishing analysis is to be performed. The email 500 may be one of a collection of emails to be analyzed that are collected in the format of '.mbox' or '.eml', both of which typically contains one or more email messages, including their headers, body content, attachments, and other metadata, organized into a single file.

As part of the phishing analyses described herein, a preprocessing stage may be performed on emails prior to analysis by a trained machine learning model. Various implementations of the preprocessing stage may involve multiple steps. Some implementations may involve a data preprocessing step and a text preprocessing step. Additionally, some implementations may also involve a phishing-related feature extraction step.

The data preprocessing step of some implementations may include the following operations. An email object is parsed to obtain the information including email (text) body, subject line, sender email address, receiver email address, and any email attachments. Next, the text body is extracted. In some instances, a software library may be utilized to extract the text, e.g., if the text is embedded in HyperText Markup Language (HTML). One example of such a library is the Python library referred to as "Beautiful Soup" or "beautifulsoup4". Additionally, URLs, internet protocol (IP)

addresses, and attachments are extracted from an email object, e.g., with regular expressions ("Regexes"). The text preprocessing step is discussed below with respect to FIG. 5B. The phishing-related feature extracted step is discussed below with respect to FIGS. 7 and 9.

Figure 5B:
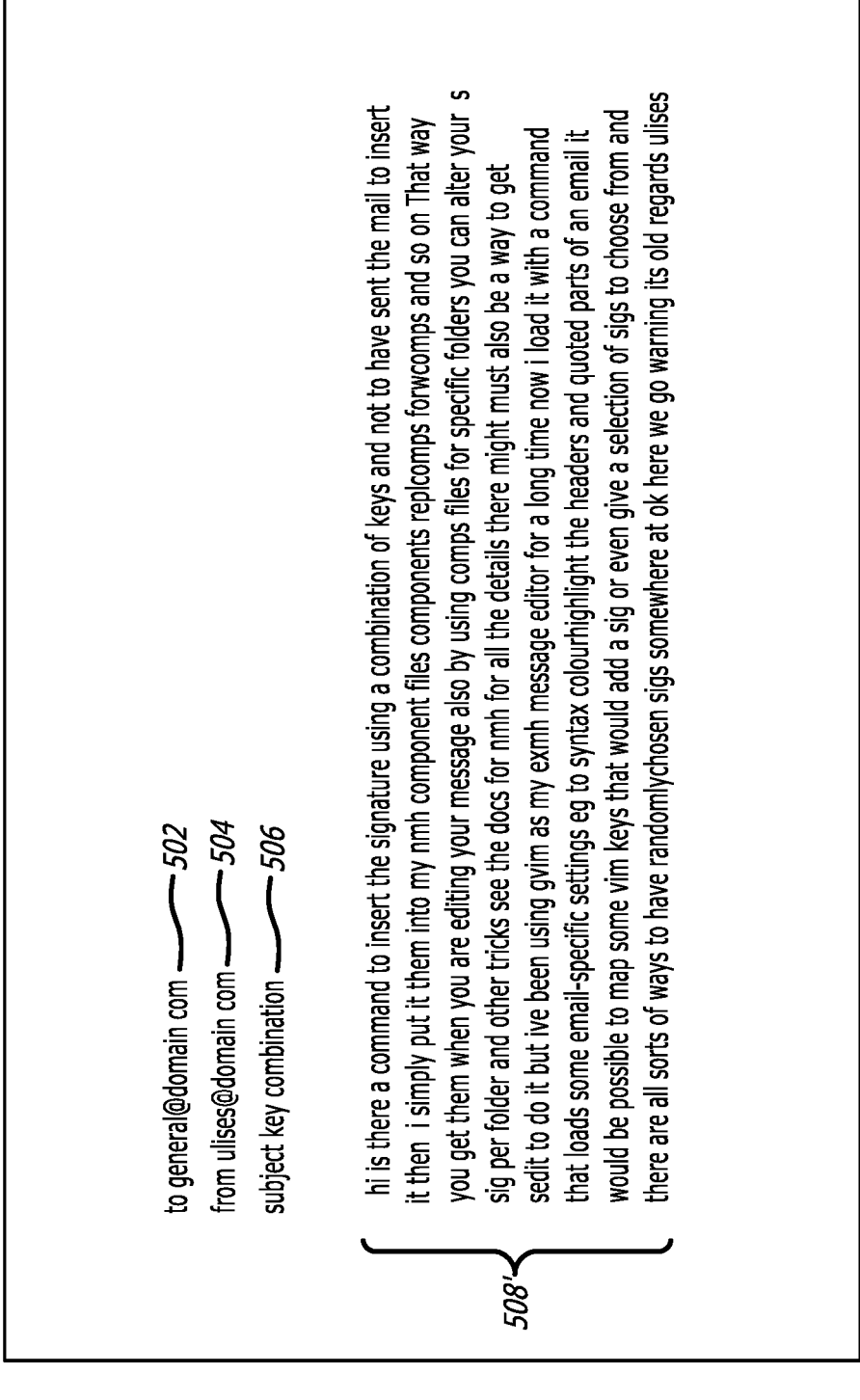
FIG. 5B illustrates the sample email of FIG. 5A following preprocessing according to an implementation of the disclosure.

FIG. 5B illustrates the sample email of FIG. 5A following text preprocessing according to an implementation of the disclosure. FIG. 5B illustrates a sample email 510, which represents the email 500 of FIG. 5A following text preprocessing. In some implementations, the text preprocessing includes a first optional step of detecting a language of the text body. In some instances, the phishing analysis is configured for specific languages, e.g., English. However, other languages may be included in such configurations. When an implementation includes a language detection step and the predefined language is detected, the text preprocessing stages moves to the subsequent steps. However, when an implementation includes the language detection step and the predefined language is not detected, the phishing analysis may determine that the corresponding email is phishing (or spam).

Assuming that the text preprocessing stage did not end at the optional language detection step, the preprocessing resulting in the sample email 510 includes operations of removing punctuation and converting the text body to all lower case. Additionally, it is noted that the processing of the systems and methods disclosed herein do not alter the grammatical and spelling errors included in the text body, as such errors might serve as useful features implicitly captured by the machine learning model deployed by the deep learning platform. Additionally, the recipient email address 502, the sender email address 504, and the subject line 506 of the sample email 510 are concatenated to the beginning of the preprocessed text body 508'.

FIG. 6 is a flowchart illustrating an example process of operations for performing a phishing analysis utilizing the model of FIG. 2A according to an implementation of the disclosure. Each block illustrated in FIG. 6 represents an operation of the method 600 performed by components of the networked environment 100 of FIG. 1, where some operations of the method 600 may be optional. The method 600 begins with the construction of a phishing email detection model ("detection model") deployment (block 602). The detection model deployment may include a detection model, a set of linear layers, and an activation function. The detection model may be constructed with a multi-layer transformer encoder architecture comprising a plurality of transformer blocks. In some examples, the detection model may be comprised of twelve transformer blocks. The set of linear layers may include two linear layers. Further, the activation function may utilize a softmax activation function.

The detection model may be tuned on training data with a plurality of epochs, e.g., twenty epochs (block 604). During the turning, the parameters of the detection model may be frozen (e.g., remain unchanged) except for the parameters of the last transformer layer (e.g., the transformer layer closer to the output), which is illustrated as the uppermost layer of nodes (circles) below the vector sequences 210, 226 of FIGS. 2A, 2B. Following tuning, the detection model deployment is ready to classify text of an email.

Following receipt of an email to be classified, the text of the email body is concatenated with a recipient's email address, a sender's email address, and a subject line. The concatenated text is then tokenized resulting in a tokenized sequence (block 606). The tokenized sequence is provided as input to the detection model, which processes the token sequence resulting in a contextualized embedding sequence (block 608). A set of linear layers is then applied to a first vector of the contextualized embedding sequence reducing the dimensionality of the first vector to two dimensions (block 610). An activation function is applied to the two-dimensional output of the set of linear layers, which yields a classification prediction of either phishing or non-phishing (block 612).

In one implementation, the detection model was built using a BERT encoder model and was tuned on a training set over a plurality of epochs, e.g., over 20 epochs. The parameters of the detection model were frozen during the model tuning except the parameters of the last transformer layers in order to prevent the phenomenon of "forgetting" that commonly occurs when training a large language model on a new domain. The detection model was configured to provide a contextualized embedding sequence as output with the contextualized embedding sequence comprised of vectors each having 768-dimensions. To reduce the dimensionality, two linear layers were incorporated to bring the dimensions down to 512 and then to 2 to enable the introduction of trainable parameters to the tuning. The dimensionality of the linear layers were chosen based on experiential data to improve the accuracy of the detection model and reduce false positives. With the large number of parameters utilized by the detection model and pre-training including knowledge outside of the email domain, the detection model avoids the overfitting problem commonly observed with LSTM models. This reduces the number of false positive cases.

FIG. 7 is a flowchart illustrating an example process of operations for performing a phishing analysis utilizing the model of FIG. 2B according to an implementation of the disclosure. Each block illustrated in FIG. 7 represents an operation of the method 700 performed by components of the networked environment 100 of FIG. 1, where some operations of the method 700 may be optional. The method 700 assumes that the operations of constructing a phishing email detection model deployment and tuning the detection model therein as discussed in FIG. 6 was previously performed. The method 700 begins with obtaining an email object and extracting phishing-related features therefrom (block 702). Further detail with respect to the phishing-related features is discussed below at least with respect to FIG. 9. The method 700 then includes concatenating the text of the email body with a recipient's email address, a sender's email address, and a subject line. The concatenated text is then tokenized resulting in a tokenized sequence (block 704). The tokenized sequence is provided as input to the detection model, which processes the token sequence resulting in a contextualized embedding sequence (block 706). The extracted phishing-related features are then concatenated to a first vector of the contextualized embeddings (block 708). A set of linear layers is then applied to a first vector of the contextualized embedding sequence reducing the dimensionality of the first vector to two dimensions (block 710). An activation function is applied to the two-dimensional output of the set of linear layers, which yields a classification prediction of either phishing or non-phishing (block 712).

Figure 8:
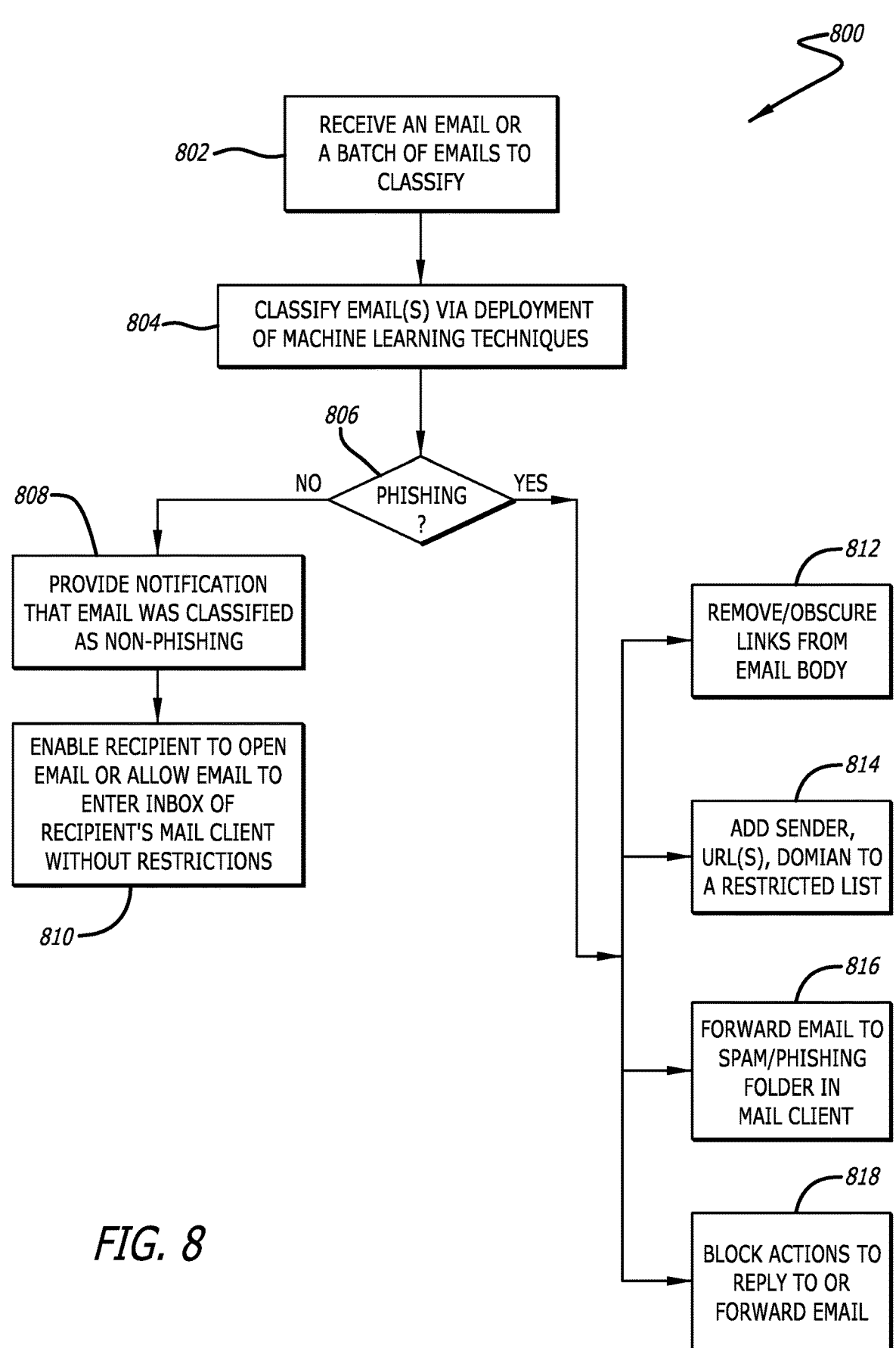
FIG. 8 is a flowchart illustrating an example process of operations for performing a first phishing analysis and potential remediation efforts following a determination that the email is a phishing email according to an implementation of the disclosure.

FIG. 8 is a flowchart illustrating an example process of operations for performing a first phishing analysis and potential remediation efforts following a determination that the email is a phishing email according to an implementation of the disclosure. Each block illustrated in FIG. 8 represents an operation of the method 800 performed by components of the networked environment 100 of FIG. 1, where some operations of the method 800 may be optional. The method 800 begins when an email or batch of emails are received by a data intake and query system to be classified as phishing or non-phishing (block 802). In some embodiments, the data intake and query system may retrieve the emails from an email datastore via execution of a search query such as a pipelined search query. As noted above, the emails may be retrieved in the form of mbox or .eml files. The emails are then classified through deployment of machine learning techniques (block 804). For example, the emails may be provided to a deep learning platform, which may deploy a trained machine learning model using the emails as input. The model then provides a classification prediction for each email.

For each email, when an email is not classified as phishing (no at block 806), an optional operation may be performed that causes a notification to be provided to a recipient or administrator that the email was classified as non-phishing (block 808) and the recipient is permitted to open the email or the email is allowed to enter the inbox of the recipient's mail client with restrictions (block 810). As noted above, other implementations may exist in which the recipient previously opened the email and flagged it as potentially phishing. In such instances, the recipient may be notified that the email was not classified as phishing.

However, when an email is classified as phishing (yes at block 806), one or more of a plurality of remediation and/or preventive efforts may be automatically implemented. For example, the email may be delivered to the recipient's inbox following an automated removal or obscuring of links (URLs) from the email text body (block 812). Additionally, the sender email address, any URLs within the email text body, and/or the email domain of the sender may be added to a deny (or restricted) list (block 814). In some instances, the email may be forwarded to a spam or phishing folder in the recipient's email client (block 816). For example, the data intake and query system may generate instructions for a third-party application (email client) to place the email in a particular folder. Additionally, replies or forwards may be blocked (block 818). For example, the data intake and query system may generate instructions for a third-party application (email client) to block a recipient's ability to reply to or forward the email classified as phishing. As discussed above, a recipient may also be notified via an alert or a graphical alteration to the email, e.g., a banner added to the email header or body that indicates that the email was classified as phishing.

Figure 9:
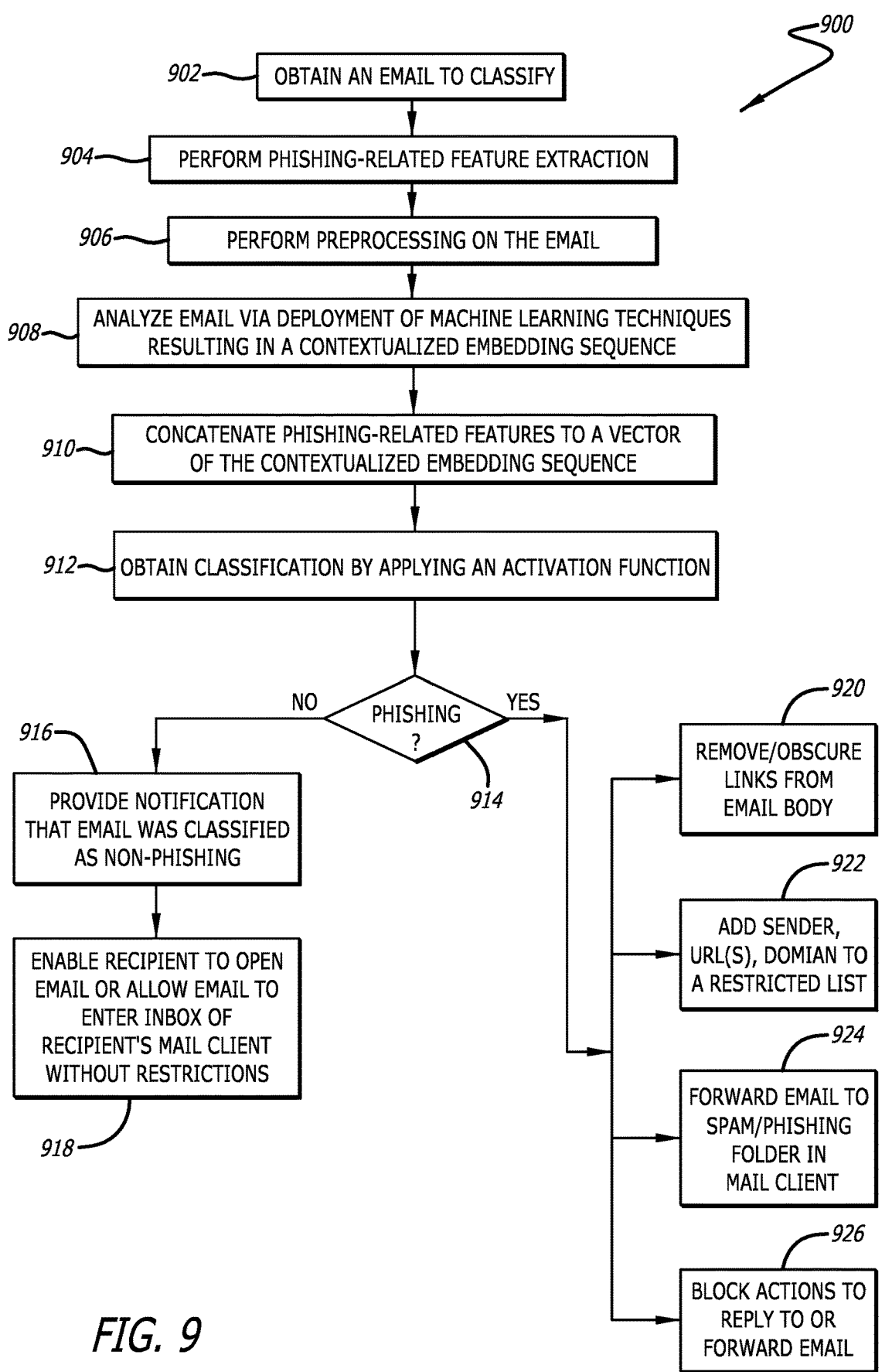
FIG. 9 is a flowchart illustrating an example process of operations for performing a second phishing analysis and potential remediation efforts following a determination that the email is a phishing email according to an implementation of the disclosure.

FIG. 9 is a flowchart illustrating an example process of operations for performing a second phishing analysis and potential remediation efforts following a determination that the email is a phishing email according to an implementation of the disclosure. Each block illustrated in FIG. 9 represents an operation of the method 900 performed by components of the networked environment 100 of FIG. 1, where some operations of the method 900 may be optional. The method 900 begins when an email or batch of emails are received by a data intake and query system to be classified as phishing or non-phishing (block 902). Examples of methods for obtaining an email or batch of emails are discussed above with respect to FIG. 8. The operations of blocks 904-924 are performed for the individual emails retrieved in the operation of block 902.

In the method 900, phishing-related features are extracted from the email object (which may include the recipient and sender email addresses, the subject line, the email text body, and any attachments) (block 904). In some instances, which may depending on the particular machine learning model utilized for phishing analysis, concatenating text-based features with extra phishing-related features as input to the machine learning model may improve the ability of the machine learning model to accurately classify an email as phishing or non-phishing. Therefore, the method 900 includes an operation to extract phishing-related features prior to the machine learning analysis. Specifically, the machine learning models learn feature representation, and the phishing-related features supplement the models in learning characteristics that may not be readily ascertainable based on the email text body.

Examples of the phishing-related features are discussed below. A first example of phishing-related features is the inclusion of sensitive words from a predefined list relating to phishing. The predefined list may include words extracted from user-reported abuses (e.g., known or detected phishing attacks). The predefined list may be routinely updated as phishing or other cyberattacks are detected. An example subset of sensitive words, numbers, symbols, or terms may include: {0%; 0% risk; 777; 99%; 99.9%; 100%; 100% more; #1; $$$; 100% free; 100% satisfied; 4 U; 50% off; Accept credit cards; Acceptance; Access; Access now; Access for free; Accordingly; Act Now; Act immediately; Action; Action required; Ad; Additional income, etc.}. It is understood that non-phishing text data is also likely to contain words from this list; however, the addition of the features provides more distribution information for the models to learn from and classify emails.

A second example of phishing-related features is the inclusion of a suspicious link within the email text body. Although it is common to have links inserted in working emails, when it comes to phishing data, those links are usually malicious or abusive. Therefore, containing a suspicious link can be a decisive factor in phishing detection. The criteria used in determining whether a link is suspicious include: if the URL does not start with http or https; if the URL contains IP address instead of domain name; if the URL contains a port number; if the URL contains double slashes after the protocol; or if the URL contains a suspicious top-level domain such as ".zip", ".exe", ".rar", ".js" or ".scr".

A third example of phishing-related features is the inclusion of whether a link that includes an IP address is present within the email text body. Although also covered in the criteria of determining a suspicious link, whether a link (URL) contains IP address may be utilized as a separate feature because of its high occurrence in URL phishing attempts.

A fourth example of phishing-related features is an indication as to whether the sender and recipient email addresses are from the different domains. For example, in the case of enterprise emails, it is often necessary to exercise caution when the sender email address originates from outside of the enterprise domain. A fifth example of phishing-related features is an indication as to whether the email object includes one or more attachments. Some phishing attacks use attachments containing executable files or malwares to attack the receivers.

A sixth example of phishing-related features is an indication as to whether the email text body includes a link with commonly abused web services. An example list of commonly abused web services may include activehosted.com, clickfunnels.com, clickup-attachments.com, etc. A seventh example of phishing-related features is an indication as to whether the email text body includes a link with a common dynamic domain name system (DNS) hostname. An example list of common dynamic DNS hostnames may include 0099098.ru, 0739zy.xyz, 04sakau.tk, etc.

Additionally, the step of extracting phishing-related features may include operations of removing numbers, URLs or other hyperlinks, and IP addresses from the text body, which may be performed using regular expressions. Numbers, URLs or other hyperlinks, and IP addresses are considered phishing-related features, thus to avoid repetition in considering these features by the machine learning model and through concatenation following the machine learning processing, these features are removed during preprocessing and not analyzed by the machine learning model.

Still referring to FIG. 9, following the extraction of phishing-related features, the method 900 includes performing preprocessing on the email object (block 906). The preprocessing operations are discussed above and noted as optionally including multiple steps, such as a data preprocessing step and a text preprocessing step. The phishing-related feature extraction may be considered a preprocessing step in some instances; however, for purposes of clarity and detail, the phishing-related feature extraction step is discussed separately with respect to the method 900. Following the preprocessing operations, the email is analyzed via deployment of machine learning techniques (block 908). Deployment of various machine learning models are discussed in depth above. Additionally, the text of the email, following any alterations during preprocessing, is tokenized such that a token sequence is provided as input to a machine learning model. The machine learning model provides a contextualized embedding sequence and the extracted phishing-related features are concatenated to a first vector of the contextualized embedding sequence (such as the vector C 227 of FIG. 2B) (block 910). A classification prediction is then obtained through the application of an activation function (block 912). As noted above, the first vector of the contextualized embedding sequence including the phishing-related features may be reduced in dimensionality by one or more linear layers prior to application of the activation function.

When the email is not classified as phishing (no at block 914), an optional operation may be performed that causes a notification to be provided to a recipient or administrator that the email was classified as non-phishing (block 916) and the recipient is permitted to open the email or the email is allowed to enter the inbox of the recipient's mail client with restrictions (block 918). As noted above, other implementations may exist in which the recipient previously opened the email and flagged it as potentially phishing. In such instances, the recipient may be notified that the email was not classified as phishing.

However, when the email is classified as phishing (yes at block 914), one or more of a plurality of remediation and/or preventive efforts may be automatically implemented. For example, the email may be delivered to the recipient's inbox following an automated removal or obscuring of links (URLs) from the email text body (block 920). Additionally, the sender email address, any URLs within the email text body, and/or the email domain of the sender may be added to a deny (or restricted) list (block 922). In some instances, the email may be forwarded to a spam or phishing folder in the recipient's email client (block 924). For example, the data intake and query system may generate instructions for a third-party application (email client) to place the email in a particular folder. Additionally, replies or forwards may be blocked (block 926). For example, the data intake and query system may generate instructions for a third-party application (email client) to block a recipient's ability to reply to or forward the email classified as phishing. As discussed above, a recipient may also be notified via an alert or a graphical alteration to the email, e.g., a banner added to the email header or body that indicates that the email was classified as phishing.

FIG. 10 is a sample graphical user interface illustrating a sample pipelined search query that when executed initiates a phishing analysis on an email and the results of the phishing analysis according to an implementation of the disclosure. The graphical user interface (GUI) 1000 of FIG. 10 provides one example of an interface that may be generated by a data intake and query system and displayed for an administrator or other user. The GUI 1000 may in addition to any alerts or notifications provided to a user or admin. The GUI 1000 is shown to include a search portion that includes a search query 1002, where the search query 1002 includes at least a first command ("eval") 1004 and a second command ("fit") 1006. The first command ("eval") 1004 is configured to create a new field "text" and assign the text of an email to the field "text". The second command ("fit") 1006 is configured to apply a machine learning model to the contents of the field "text" and provide a classification prediction as a result.

The GUI 1000 includes a results section 1008 that provides certain information about the phishing analysis performed by the machine learning model such as a time of analysis 1010, the text analyzed 1012, and classification prediction 1014. The result section 1008 may be stored in a log or other database for record keeping or review at a later date. In some implementations, an administrator or other user may be able to provide user input to confirm or correct the classification prediction 1014. For instance, following a classification prediction that an email is a phishing email, the email may be opened within a sandboxed environment (e.g., no internet access) where all operations performed within the sandboxed environment are monitored and optionally recorded. Following analysis of the opening of the email and selection of any links within the sandboxed environment, a determination may be made to confirm the classification prediction as a phishing email or correct the classification prediction to non-phishing. Such information may be utilized in retraining one or more models of the deep learning platform. Such as the deep learning platform 104 of FIG. 1.

FIG. 11 is a flowchart illustrating an example process 1100 for determining whether an email is a phishing email according to an implementation of the disclosure. The example process 1100 can be implemented, for example, by a computing device that comprises a processor and a non-transitory computer-readable medium. The non-transitory computer readable medium can be storing instructions that, when executed by the processor, can cause the processor to perform the operations of the illustrated process 1100. Alternatively or additionally, the process 1100 can be implemented using a non-transitory computer-readable medium storing instructions that, when executed by one or more processors, cause the one or more processors to perform the operations of the process 1100 of FIG. 11.

Each block illustrated in FIG. 11 represents an operation of the process 1100 where some operations of the process 1100 may be optional. The process 1100 begins with obtaining an email object that is to be classified as phishing or non-phishing (block 1102). As discussed above, the email object may be obtained through a variety of methods including execution of a search query to retrieve one or more email objects, through the capture of network traffic by a network appliance (e.g., a firewall), from a third-party email client following a recipient flagging an email as potentially phishing, etc. The process 1100 continues with generating a token sequence by tokenizing a text portion of the email object and deploying a machine learning model with the token sequence as input to the machine learning model resulting in a contextualized embedding sequence, wherein the contextualized embedding sequence is formed of a plurality of contextualized embedding vectors (blocks 1104, 1106). Following deployment of the machine learning model, the process 1100 includes reducing a dimension of a first contextualized embedding vector with one or more linear layers resulting in a low-dimensionality vector and applying an activation function to the low-dimensionality vector resulting in a classification prediction of phishing or non-phishing (blocks 1108, 1110).

In some implementations, the machine learning model is constructed with a multi-layer transformer encoder architecture comprising a plurality of transformer blocks. Additionally, the one or more linear layers may include a first linear layer configured to reduce the dimension of the first contextualized embedding vector from 768-dimensions to 512-dimensions, and a second linear layer configured to further reduce the dimension of the first contextualized embedding vector from 512-dimensions to 2-dimensions resulting in the low-dimensionality vector.

In some implementations, the email object includes components of an email including a recipient email address, a sender email address, a subject line, and a text body. Additionally, the email object may further include an attachment to the email. The process 1100 may further include operations of extracting phishing-related features from the email object, and prior to reducing the dimension of the first contextualized embedding vector, concatenating the phishing-related features to the first contextualized embedding vector. In some implementations, obtaining the email object includes executing a search query to retrieve the email object as one of a batch of email objects.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 12:
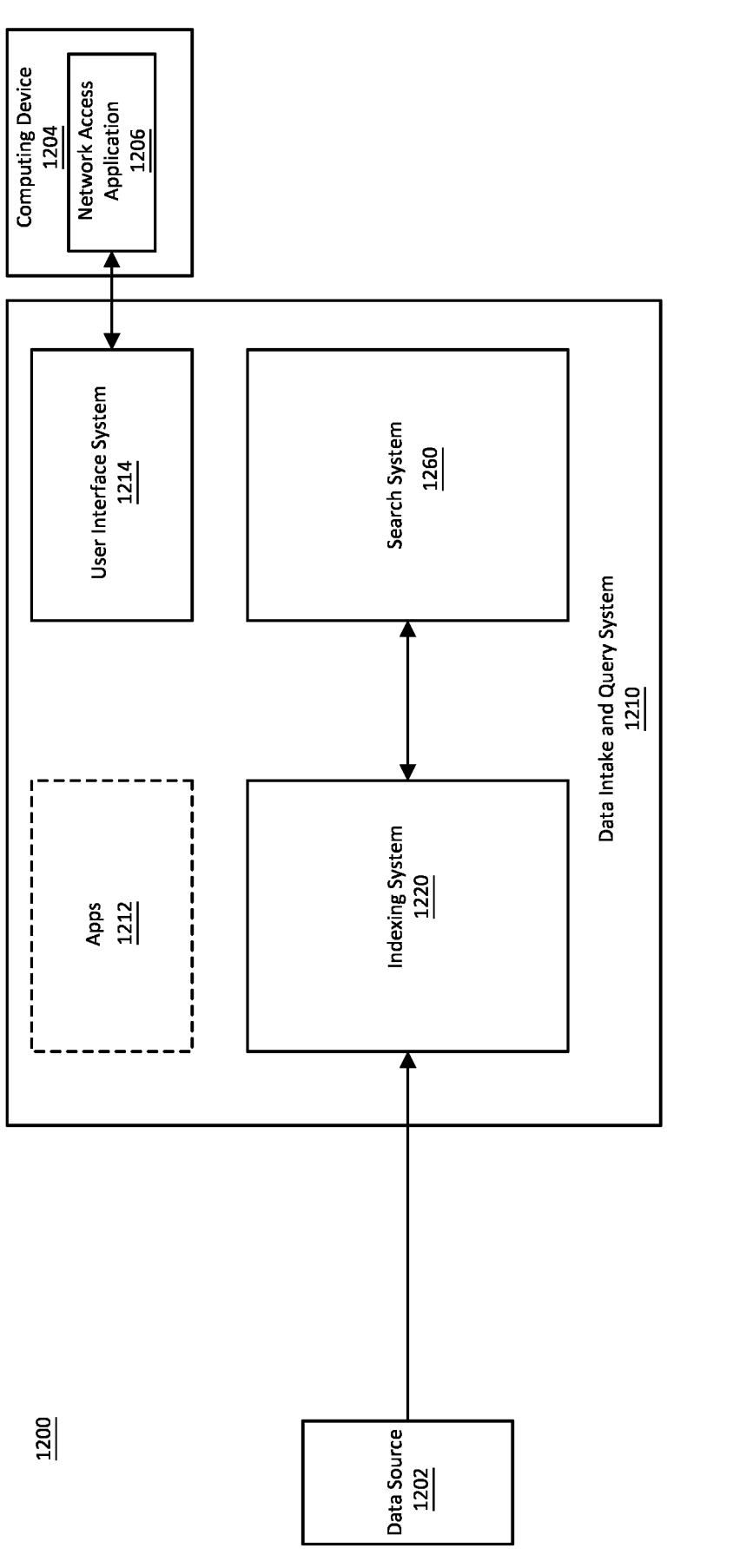
FIG. 12 is a block diagram illustrating an example computing environment that includes a data intake and query system according to an implementation of the disclosure.

FIG. 12 is a block diagram illustrating an example computing environment 1200 that includes a data intake and query system 1210. The data intake and query system 1210 obtains data from a data source 1202 in the computing environment 1200, and ingests the data using an indexing system 1220. A search system 1260 of the data intake and query system 1210 enables users to navigate the indexed data. Though drawn with separate boxes in FIG. 12, in some implementations the indexing system 1220 and the search system 1260 can have overlapping components. A computing device 1204, running a network access application 1206, can communicate with the data intake and query system 1210 through a user interface system 1214 of the data intake and query system 1210. Using the computing device 1204, a user can perform various operations with respect to the data intake and query system 1210, such as administration of the data intake and query system 1210, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 1210 can further optionally include apps 1212 that extend the search, analytics, and/or visualization capabilities of the data intake and query system 1210.

The data intake and query system 1210 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 1210 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 1210 can be executed on a single computing device, or execution of the program code can be distributed over multiple computing devices. For example, the program code can include instructions for both indexing and search components (which may be part of the indexing system 1220 and/or the search system 1260, respectively), which can be executed on a computing device that also provides the data source 1202. As another example, the program code can be executed on one computing device, where execution of the program code provides both indexing and search components, while another copy of the program code executes on a second computing device that provides the data source 1202. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 1202 of the computing environment 1200 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 1202 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 1220 obtains machine data from the data source 1202 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 1220 does not require prior knowledge of the structure of incoming data (e.g., the indexing system 1220 does not need to be provided with a schema describing the data). Additionally, the indexing system 1220 retains a copy of the data as it was received by the indexing system 1220 such that the original data is always available for searching (e.g., no data is discarded, though, in some examples, the indexing system 1220 can be configured to do so).

The search system 1260 searches the data stored by the indexing 1220 system. As discussed in greater detail below, the search system 1260 enables users associated with the computing environment 1200 (and possibly also other users) to navigate the data, generate reports, and visualize search results in "dashboards" output using a graphical interface. Using the facilities of the search system 1260, users can obtain insights about the data, such as retrieving events from an index, calculating metrics, searching for specific conditions within a rolling time window, identifying patterns in the data, and predicting future trends, among other examples. To achieve greater efficiency, the search system 1260 can apply map-reduce methods to parallelize searching of large volumes of data. Additionally, because the original data is available, the search system 1260 can apply a schema to the data at search time. This allows different structures to be applied to the same data, or for the structure to be modified if or when the content of the data changes. Application of a schema at search time may be referred to herein as a late-binding schema technique.

The user interface system 1214 provides mechanisms through which users associated with the computing environment 1200 (and possibly others) can interact with the data intake and query system 1210. These interactions can include configuration, administration, and management of the indexing system 1220, initiation and/or scheduling of queries that are to be processed by the search system 1260, receipt or reporting of search results, and/or visualization of search results. The user interface system 1214 can include, for example, facilities to provide a command line interface or a web-based interface.

Users can access the user interface system 1214 using a computing device 1204 that communicates with data intake and query system 1210, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 1200. For example, a person can log in as a particular user and, using the user's digital information, can access the data intake and query system 1210. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 1204 can provide a human-machine interface through which a person can have a digital presence in the computing environment 1200 in the form of a user. The computing device 1204 is an electronic device having one or more processors and a memory capable of storing instructions for execution by the one or more processors. The computing device 1204 can further include input/output (I/O) hardware and a network interface. Applications executed by the computing device 1204 can include a network access application 1206, such as a web browser, which can use a network interface of the client computing device 1204 to communicate, over a network, with the user interface system 1214 of the data intake and query system 1210. The user interface system 1214 can use the network access application 1206 to generate user interfaces that enable a user to interact with the data intake and query system 1210. A web browser is one example of a network access application. A shell tool can also be used as a network access application. In some examples, the data intake and query system 1210 is an application executing on the computing device 1206. In such examples, the network access application 1206 can access the user interface system 1214 without going over a network.

The data intake and query system 1210 can optionally include apps 1212. An app of the data intake and query system 1210 is a collection of configurations, knowledge objects (a user-defined entity that enriches the data in the data intake and query system 1210), views, and dashboards that may provide additional functionality, different techniques for searching the data, and/or additional insights into the data. The data intake and query system 1210 can execute multiple applications simultaneously. Example applications include an information technology service intelligence application, which can monitor and analyze the performance and behavior of the computing environment 1200, and an enterprise security application, which can include content and searches to assist security analysts in diagnosing and acting on anomalous or malicious behavior in the computing environment 1200.

Though FIG. 12 illustrates only one data source, in practical implementations, the computing environment 1200 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 1200, the data intake and query system 1210 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with the subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 1200 can include on-prem and cloud-based computing resources, or only cloud-based resources. For example, an entity may have on-prem computing devices and a private cloud. In this example, the entity operates the data intake and query system 1210 and can choose to execute the data intake and query system 1210 on an on-prem computing device or in the cloud. In another example, a provider entity operates the data intake and query system 1210 in a public cloud and provides the functionality of the data intake and query system 1210 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 1210. In some implementations, the entity providing the data intake and query system 1210 is itself subscribing to the cloud services of a cloud service provider. As an example, a first entity provides computing resources under a public cloud service model, a second entity subscribes to the cloud services of the first provider entity and uses the cloud computing resources to operate the data intake and query system 1210, and a third entity can subscribe to the services of the second provider entity in order to use the functionality of the data intake and query system 1210. In this example, the data sources are associated with the third entity, users accessing the data intake and query system 1210 are associated with the third entity, and the analytics and insights provided by the data intake and query system 1210 are for purposes of the third entity's operations.

Figure 13:
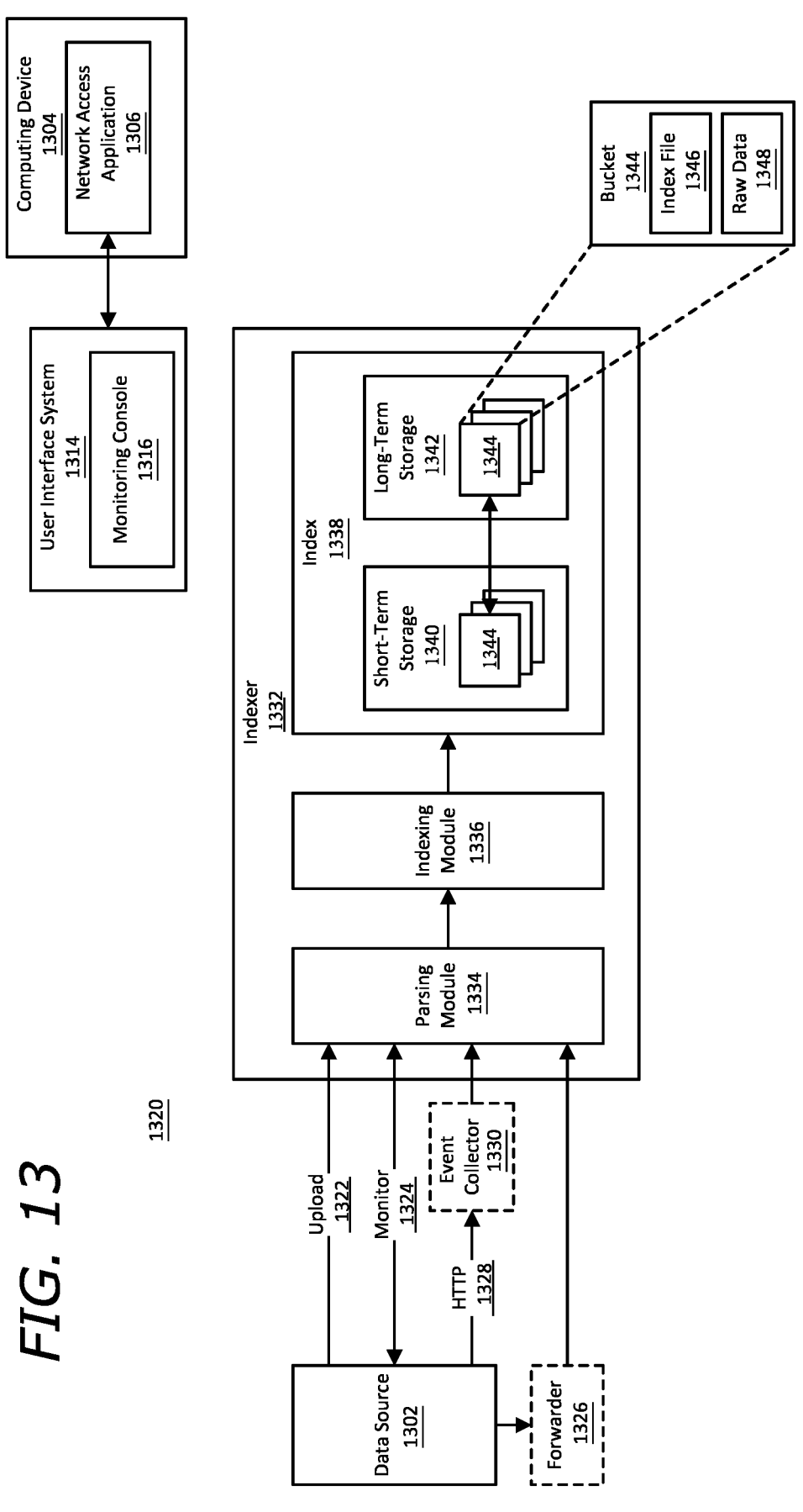
FIG. 13 is a block diagram illustrating in greater detail an example of an indexing system of a data intake and query system, such as the data intake and query system of FIG. 12 according to an implementation of the disclosure.

FIG. 13 is a block diagram illustrating in greater detail an example of an indexing system 1320 of a data intake and query system, such as the data intake and query system 1210 of FIG. 12. The indexing system 1320 of FIG. 13 uses various methods to obtain machine data from a data source 1302 and stores the data in an index 1338 of an indexer 1332. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1320 enables the data intake and query system to obtain the machine data produced by the data source 1302 and to store the data for searching and retrieval.

Users can administer the operations of the indexing system 1320 using a computing device 1304 that can access the indexing system 1320 through a user interface system 1314 of the data intake and query system. For example, the computing device 1304 can be executing a network access application 1306, such as a web browser or a terminal, through which a user can access a monitoring console 1316 provided by the user interface system 1314. The monitoring console 1316 can enable operations such as: identifying the data source 1302 for data ingestion; configuring the indexer 1332 to index the data from the data source 1332; configuring a data ingestion method; configuring, deploying, and managing clusters of indexers; and viewing the topology and performance of a deployment of the data intake and query system, among other operations. The operations performed by the indexing system 1320 may be referred to as "index time" operations, which are distinct from "search time" operations that are discussed further below.

The indexer 1332, which may be referred to herein as a data indexing component, coordinates and performs most of the index time operations. The indexer 1332 can be implemented using program code that can be executed on a computing device. The program code for the indexer 1332 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1332. In some implementations, the indexer 1332 executes on the computing device 1304 through which a user can access the indexing system 1320. In some implementations, the indexer 1332 executes on a different computing device than the illustrated computing device 1304.

The indexer 1332 may be executing on the computing device that also provides the data source 1302 or may be executing on a different computing device. In implementations wherein the indexer 1332 is on the same computing device as the data source 1302, the data produced by the data source 1302 may be referred to as "local data." In other implementations the data source 1302 is a component of a first computing device and the indexer 1332 executes on a second computing device that is different from the first computing device. In these implementations, the data produced by the data source 1302 may be referred to as "remote data." In some implementations, the first computing device is "on-prem" and in some implementations the first computing device is "in the cloud." In some implementations, the indexer 1332 executes on a computing device in the cloud and the operations of the indexer 1332 are provided as a service to entities that subscribe to the services provided by the data intake and query system.

For a given data produced by the data source 1302, the indexing system 1320 can be configured to use one of several methods to ingest the data into the indexer 1332. These methods include upload 1322, monitor 1324, using a forwarder 1326, or using HyperText Transfer Protocol (HTTP 1328) and an event collector 1330. These and other methods for data ingestion may be referred to as "getting data in" (GDI) methods.

Using the upload 1322 method, a user can specify a file for uploading into the indexer 1332. For example, the monitoring console 1316 can include commands or an interface through which the user can specify where the file is located (e.g., on which computing device and/or in which directory of a file system) and the name of the file. The file may be located at the data source 1302 or maybe on the computing device where the indexer 1332 is executing. Once uploading is initiated, the indexer 1332 processes the file, as discussed further below. Uploading is a manual process and occurs when instigated by a user. For automated data ingestion, the other ingestion methods are used.

The monitor 1324 method enables the indexing system 1302 to monitor the data source 1302 and continuously or periodically obtain data produced by the data source 1302 for ingestion by the indexer 1332. For example, using the monitoring console 1316, a user can specify a file or directory for monitoring. In this example, the indexing system 1302 can execute a monitoring process that detects whenever the file or directory is modified and causes the file or directory contents to be sent to the indexer 1332. As another example, a user can specify a network port for monitoring. In this example, a monitoring process can capture data received at or transmitting from the network port and cause the data to be sent to the indexer 1332. In various examples, monitoring can also be configured for data sources such as operating system event logs, performance data generated by an operating system, operating system registries, operating system directory services, and other data sources.

Monitoring is available when the data source 1302 is local to the indexer 1332 (e.g., the data source 1302 is on the computing device where the indexer 1332 is executing). Other data ingestion methods, including forwarding and the event collector 1330, can be used for either local or remote data sources.

A forwarder 1326, which may be referred to herein as a data forwarding component, is a software process that sends data from the data source 1302 to the indexer 1332. The forwarder 1326 can be implemented using program code that can be executed on the computer device that provides the data source 1302. A user launches the program code for the forwarder 1326 on the computing device that provides the data source 1302. The user can further configure the forwarder 1326, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1326 can provide various capabilities. For example, the forwarder 1326 can send the data unprocessed or can perform minimal processing on the data before sending the data to the indexer 1332. Minimal processing can include, for example, adding metadata tags to the data to identify a source, source type, and/or host, among other information, dividing the data into blocks, and/or applying a timestamp to the data. In some implementations, the forwarder 1326 can break the data into individual events (event generation is discussed further below) and send the events to a receiver. Other operations that the forwarder 1326 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1330 provides an alternate method for obtaining data from the data source 1302. The event collector 1330 enables data and application events to be sent to the indexer 1332 using HTTP 1328. The event collector 1330 can be implemented using program code that can be executed on a computing device. The program code may be a component of the data intake and query system or can be a standalone component that can be executed independently of the data intake and query system and operates in cooperation with the data intake and query system.

To use the event collector 1330, a user can, for example using the monitoring console 1316 or a similar interface provided by the user interface system 1314, enable the event collector 1330 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 1302 as an alternative method to using a username and password for authentication.

To send data to the event collector 1330, the data source 1302 is supplied with a token and can then send HTTP 1328 requests to the event collector 1330. To send HTTP 1328 requests, the data source 1302 can be configured to use an HTTP client and/or to use logging libraries such as those supplied by Java, JavaScript, and .NET libraries. An HTTP client enables the data source 1302 to send data to the event collector 1330 by supplying the data, and a Uniform Resource Identifier (URI) for the event collector 1330 to the HTTP client. The HTTP client then handles establishing a connection with the event collector 1330, transmitting a request containing the data, closing the connection, and receiving an acknowledgment if the event collector 1330 sends one. Logging libraries enable HTTP 1328 requests to the event collector 1330 to be generated directly by the data source. For example, an application can include or link a logging library, and through functionality provided by the logging library manage establishing a connection with the event collector 1330, transmitting a request, and receiving an acknowledgement.

An HTTP 1328 request to the event collector 1330 can contain a token, a channel identifier, event metadata, and/or event data. The token authenticates the request with the event collector 1330. The channel identifier, if available in the indexing system 1320, enables the event collector 1330 to segregate and keep separate data from different data sources. The event metadata can include one or more key-value pairs that describe the data source 1302 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 1330 extracts events from HTTP 1328 requests and sends the events to the indexer 1332. The event collector 1330 can further be configured to send events to one or more indexers. Extracting the events can include associating any metadata in a request with the event or events included in the request. In these implementations, event generation by the indexer 1332 (discussed further below) is bypassed, and the indexer 1332 moves the events directly to indexing. In some implementations, the event collector 1330 extracts event data from a request and outputs the event data to the indexer 1332, and the indexer generates events from the event data. In some implementations, the event collector 1330 sends an acknowledgement message to the data source 1302 to indicate that the event collector 1330 has received a particular request form the data source 1302, and/or to indicate to the data source 1302 that events in the request have been added to an index.

The indexer 1332 ingests incoming data and transforms the data into searchable knowledge in the form of events. In the data intake and query system, an event is a single piece of data that represents activity of the component represented in FIG. 13 by the data source 1302. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1332 can include a parsing module 1334 and an indexing module 1336 for generating and storing the events. The parsing module 1334 and indexing module 1336 can be modular and pipelined, such that one component can be operating on a first set of data while the second component is simultaneously operating on a second sent of data. Additionally, the indexer 1332 may at any time have multiple instances of the parsing module 1334 and indexing module 1336, with each set of instances configured to simultaneously operate on data from the same data source or from different data sources. The parsing module 1334 and indexing module 1336 are illustrated in FIG. 13 to facilitate discussion, with the understanding that implementations with other components are possible to achieve the same functionality.

The parsing module 1334 determines information about incoming event data, where the information can be used to identify events within the event data. For example, the parsing module 1334 can associate a source type with the event data. A source type identifies the data source 1302 and describes a possible data structure of event data produced by the data source 1302. For example, the source type can indicate which fields to expect in events generated at the data source 1302 and the keys for the values in the fields, and possibly other information such as sizes of fields, an order of the fields, a field separator, and so on. The source type of the data source 1302 can be specified when the data source 1302 is configured as a source of event data. Alternatively, the parsing module 1334 can determine the source type from the event data, for example from an event field in the event data or using machine learning techniques applied to the event data.

Other information that the parsing module 1334 can determine includes timestamps. In some cases, an event includes a timestamp as a field, and the timestamp indicates a point in time when the action represented by the event occurred or was recorded by the data source 1302 as event data. In these cases, the parsing module 1334 may be able to determine from the source type associated with the event data that the timestamps can be extracted from the events themselves. In some cases, an event does not include a timestamp and the parsing module 1334 determines a timestamp for the event, for example from a name associated with the event data from the data source 1302 (e.g., a file name when the event data is in the form of a file) or a time associated with the event data (e.g., a file modification time). As another example, when the parsing module 1334 is not able to determine a timestamp from the event data, the parsing module 1334 may use the time at which it is indexing the event data. As another example, the parsing module 1334 can use a user-configured rule to determine the timestamps to associate with events.

The parsing module 1334 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1334 may be able to determine event boundaries from the source type associated with the event data, for example from a data structure indicated by the source type. In some implementations, a user can configure rules the parsing module 1334 can use to identify event boundaries.

The parsing module 1334 can further extract data from events and possibly also perform transformations on the events. For example, the parsing module 1334 can extract a set of fields (key-value pairs) for each event, such as a host or hostname, source or source name, and/or source type. The parsing module 1334 may extract certain fields by default or based on a user configuration. Alternatively or additionally, the parsing module 1334 may add fields to events, such as a source type or a user-configured field. As another example of a transformation, the parsing module 1334 can anonymize fields in events to mask sensitive information, such as social security numbers or account numbers. Anonymizing fields can include changing or replacing values of specific fields. The parsing component 1334 can further perform user-configured transformations.

The parsing module 1334 outputs the results of processing incoming event data to the indexing module 1336, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1332 can be configured to identify searchable segments that are parts of fields, searchable segments that are entire fields, or both. The parsing module 1334 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 1346, to find event data that matches a search query. In some implementations, segmentation can alternatively be performed by the forwarder 1326. Segmentation can also be disabled, in which case the indexer 1332 will not build a lexicon for the event data. When segmentation is disabled, the search system searches the event data directly.

Building index data structures generates the index 1338. The index 1338 is a storage data structure on a storage device (e.g., a disk drive or other physical device for storing digital data). The storage device may be a component of the computing device on which the indexer 1332 is operating (referred to herein as local storage) or may be a component of a different computing device (referred to herein as remote storage) that the indexer 1338 has access to over a network. The indexer 1332 can manage more than one index and can manage indexes of different types. For example, the indexer 1332 can manage event indexes, which impose minimal structure on stored data and can accommodate any type of data. As another example, the indexer 1332 can manage metrics indexes, which use a highly structured format to handle the higher volume and lower latency demands associated with metrics data.

The indexing module 1336 organizes files in the index 1338 in directories referred to as buckets. The files in a bucket 1344 can include raw data files, index files, and possibly also other metadata files. As used herein, "raw data" means data as when the data was produced by the data source 1302, without alteration to the format or content. As noted previously, the parsing component 1334 may add fields to event data and/or perform transformations on fields in the event data. Event data that has been altered in this way is referred to herein as enriched data. A raw data file 1348 can include enriched data, in addition to or instead of raw data. The raw data file 1348 may be compressed to reduce disk usage. An index file 1346, which may also be referred to herein as a "time-series index" or tsidx file, contains metadata that the indexer 1332 can use to search a corresponding raw data file 1348. As noted above, the metadata in the index file 1346 includes a lexicon of the event data, which associates each unique keyword in the event data with a reference to the location of event data within the raw data file 1348. The keyword data in the index file 1346 may also be referred to as an inverted index. In various implementations, the data intake and query system can use index files for other purposes, such as to store data summarizations that can be used to accelerate searches.

A bucket 1344 includes event data for a particular range of time. The indexing module 1336 arranges buckets in the index 1338 according to the age of the buckets, such that buckets for more recent ranges of time are stored in short-term storage 1340 and buckets for less recent ranges of time are stored in long-term storage 1342. Short-term storage 1340 may be faster to access while long-term storage 1342 may be slower to access. Buckets may be moves from short-term storage 1340 to long-term storage 1342 according to a configurable data retention policy, which can indicate at what point in time a bucket is old enough to be moved.

A bucket's location in short-term storage 1340 or long-term storage 1342 can also be indicated by the bucket's status. As an example, a bucket's status can be "hot," "warm," "cold," "frozen," or "thawed." In this example, hot bucket is one to which the indexer 1332 is writing data and the bucket becomes a warm bucket when the index 1332 stops writing data to it. In this example, both hot and warm buckets reside in short-term storage 1340. Continuing this example, when a warm bucket is moved to long-term storage 1342, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1320 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 1320 through the monitoring console 1316 provided by the user interface system 1314. Using the monitoring console 1316, the user can configure and monitor an index cluster, and see information such as disk usage by an index, volume usage by an indexer, index and volume size over time, data age, statistics for bucket types, and bucket settings, among other information.

Figure 14:
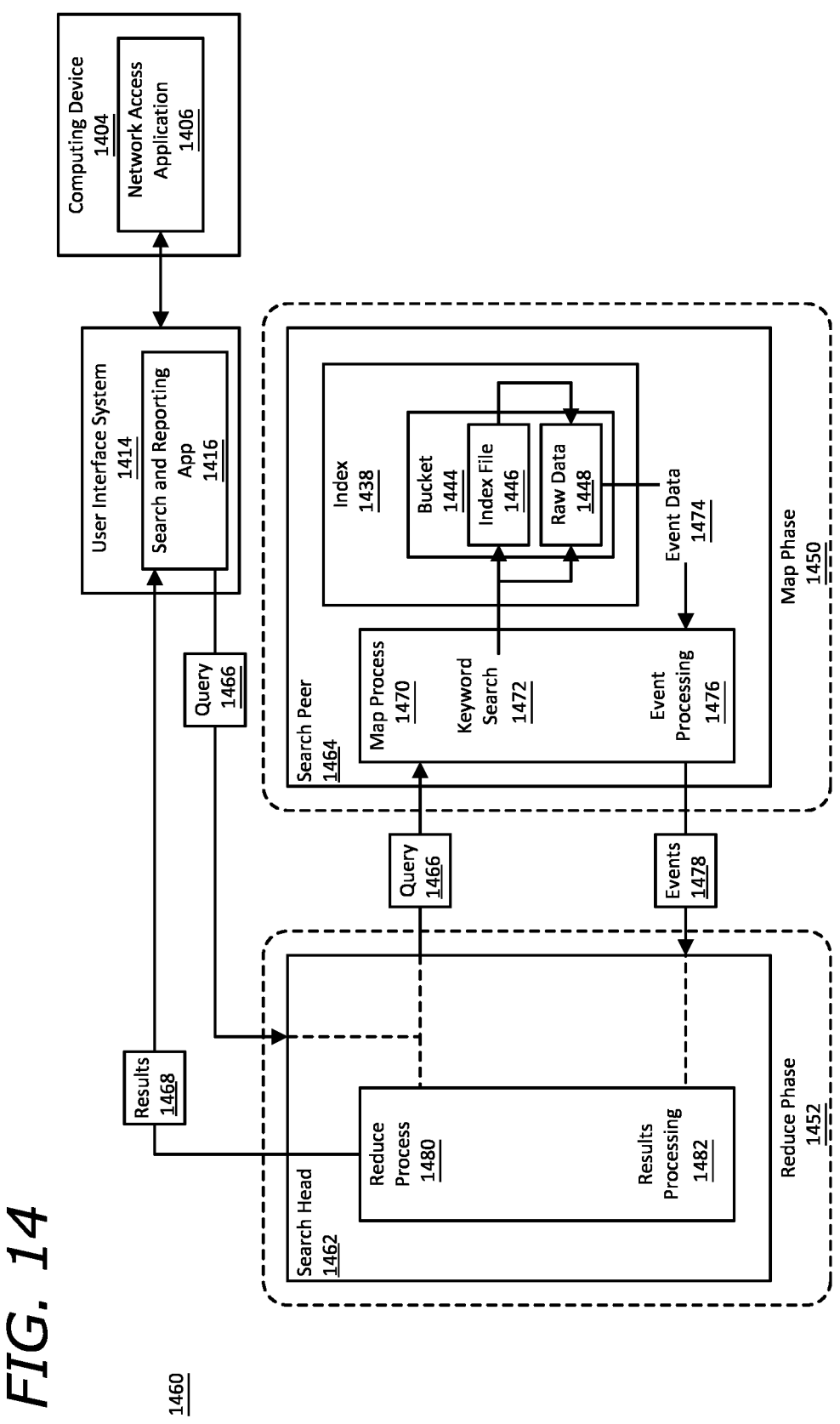
FIG. 14 is a block diagram illustrating in greater detail an example of the search system of a data intake and query system, such as the data intake and query system of FIG. 12 according to an implementation of the disclosure.

FIG. 14 is a block diagram illustrating in greater detail an example of the search system 1460 of a data intake and query system, such as the data intake and query system 1210 of FIG. 12. The search system 1460 of FIG. 14 issues a query 1466 to a search head 1462, which sends the query 1466 to a search peer 1464. Using a map process 1470, the search peer 1464 searches the appropriate index 1438 for events identified by the query 1466 and sends events 1478 so identified back to the search head 1462. Using a reduce process 1482, the search head 1462 processes the events 1478 and produces results 1468 to respond to the query 1466. The results 1468 can provide useful insights about the data stored in the index 1438. These insights can aid in the administration of information technology systems, in security analysis of information technology systems, and/or in analysis of the development environment provided by information technology systems.

The query 1466 that initiates a search is produced by a search and reporting app 1416 that is available through the user interface system 1414 of the data intake and query system. Using a network access application 1406 executing on a computing device 1404, a user can input the query 1466 into a search field provided by the search and reporting app 1416. Alternatively or additionally, the search and reporting app 1416 can include pre-configured queries or stored queries that can be activated by the user. In some cases, the search and reporting app 1416 initiates the query 1466 when the user enters the query 1466. In these cases, the query 1466 maybe referred to as an "ad-hoc" query. In some cases, the search and reporting app 1416 initiates the query 1466 based on a schedule. For example, the search and reporting app 1416 can be configured to execute the query 1466 once per hour, once per day, at a specific time, on a specific date, or at some other time that can be specified by a date, time, and/or frequency. These types of queries maybe referred to as scheduled queries.

The query 1466 is specified using a search processing language. The search processing language includes commands or search terms that the search peer 1464 will use to identify events to return in the search results 1468. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1466 to include sequential commands, where a subsequent command may operate on the results of a prior command. As an example, sequential commands may be separated in the query 1466 by a vertical line ("|" or "pipe") symbol.

In addition to one or more search commands, the query 1466 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1466 occurs in two broad phases: a map phase 1450 and a reduce phase 1452. The map phase 1450 takes place across one or more search peers. In the map phase 1450, the search peers locate event data that matches the search terms in the search query 1466 and sorts the event data into field-value pairs. When the map phase 1450 is complete, the search peers send events that they have found to one or more search heads for the reduce phase 1452. During the reduce phase 1452, the search heads process the events through commands in the search query 1466 and aggregate the events to produce the final search results 1468.

A search head, such as the search head 1462 illustrated in FIG. 14, is a component of the search system 1460 that manages searches. The search head 1462, which may also be referred to herein as a search management component, can be implemented using program code that can be executed on a computing device. The program code for the search head 1462 can be stored on a non-transitory computer-readable medium and from this medium can be loaded or copied to the memory of a computing device. One or more hardware processors of the computing device can read the program code from the memory and execute the program code in order to implement the operations of the search head 1462.

Upon receiving the search query 1466, the search head 1462 directs the query 1466 to one or more search peers, such as the search peer 1464 illustrated in FIG. 14. "Search peer" is an alternate name for "indexer" and a search peer may be largely similar to the indexer described previously. The search peer 1464 may be referred to as a "peer node" when the search peer 1464 is part of an indexer cluster. The search peer 1464, which may also be referred to as a search execution component, can be implemented using program code that can be executed on a computing device. In some implementations, one set of program code implements both the search head 1462 and the search peer 1464 such that the search head 1462 and the search peer 1464 form one component. In some implementations, the search head 1462 is an independent piece of code that performs searching and no indexing functionality. In these implementations, the search head 1462 may be referred to as a dedicated search head.

The search head 1462 may consider multiple criteria when determining whether to send the query 1466 to the particular search peer 1464. For example, the search system 1460 may be configured to include multiple search peers that each have duplicative copies of at least some of the event data and are implanted using different hardware resources q. In this example, the sending the search query 1466 to more than one search peer allows the search system 1460 to distribute the search workload across different hardware resources. As another example, search system 1460 may include different search peers for different purposes (e.g., one has an index storing a first type of data or from a first data source while a second has an index storing a second type of data or from a second data source). In this example, the search query 1466 may specify which indexes to search, and the search head 1462 will send the query 1466 to the search peers that have those indexes.

To identify events 1478 to send back to the search head 1462, the search peer 1464 performs a map process 1470 to obtain event data 1474 from the index 1438 that is maintained by the search peer 1464. During a first phase of the map process 1470, the search peer 1464 identifies buckets that have events that are described by the time indicator in the search query 1466. As noted above, a bucket contains events whose timestamps fall within a particular range of time. For each bucket 1444 whose events can be described by the time indicator, during a second phase of the map process 1470, the search peer 1464 performs a keyword search 1474 using search terms specified in the search query 1466. The search terms can be one or more of keywords, phrases, fields, Boolean expressions, and/or comparison expressions that in combination describe events being searched for. When segmentation is enabled at index time, the search peer 1464 performs the keyword search 1472 on the bucket's index file 1446. As noted previously, the index file 1446 includes a lexicon of the searchable terms in the events stored in the bucket's raw data 1448 file. The keyword search 1472 searches the lexicon for searchable terms that correspond to one or more of the search terms in the query 1466. As also noted above, the lexicon includes, for each searchable term, a reference to each location in the raw data 1448 file where the searchable term can be found. Thus, when the keyword search identifies a searchable term in the index file 1446 that matches a search term in the query 1466, the search peer 1464 can use the location references to extract from the raw data 1448 file the event data 1474 for each event that include the searchable term.

In cases where segmentation was disabled at index time, the search peer 1464 performs the keyword search 1472 directly on the raw data 1448 file. To search the raw data 1448, the search peer 1464 may identify searchable segments in events in a similar manner as when the data was indexed. Thus, depending on how the search peer 1464 is configured, the search peer 1464 may look at event fields and/or parts of event fields to determine whether an event matches the query 1466. Any matching events can be added to the event data 1474 read from the raw data 1448 file. The search peer 1464 can further be configured to enable segmentation at search time, so that searching of the index 1438 causes the search peer 1464 to build a lexicon in the index file 1446.

The event data 1474 obtained from the raw data 1448 file includes the full text of each event found by the keyword search 1472. During a third phase of the map process 1470, the search peer 1464 performs event processing 1476 on the event data 1474, with the steps performed being determined by the configuration of the search peer 1464 and/or commands in the search query 1466. For example, the search peer 1464 can be configured to perform field discovery and field extraction. Field discovery is a process by which the search peer 1464 identifies and extracts key-value pairs from the events in the event data 1474. The search peer 1464 can, for example, be configured to automatically extract the first 100 fields (or another number of fields) in the event data 1474 that can be identified as key-value pairs. As another example, the search peer 1464 can extract any fields explicitly mentioned in the search query 1466. The search peer 1464 can, alternatively or additionally, be configured with particular field extractions to perform.

Other examples of steps that can be performed during event processing 1476 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1464 sends processed events 1478 to the search head 1462, which performs a reduce process 1480. The reduce process 1480 potentially receives events from multiple search peers and performs various results processing 1482 steps on the received events. The results processing 1482 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 1482 can further include applying commands from the search query 1466 to the events. The query 1466 can include, for example, commands for evaluating and/or manipulating fields (e.g., to generate new fields from existing fields or parse fields that have more than one value). As another example, the query 1466 can include commands for calculating statistics over the events, such as counts of the occurrences of fields, or sums, averages, ranges, and so on, of field values. As another example, the query 1466 can include commands for generating statistical values for purposes of generating charts of graphs of the events.

The reduce process 1480 outputs the events found by the search query 1466, as well as information about the events. The search head 1462 transmits the events and the information about the events as search results 1468, which are received by the search and reporting app 1416. The search and reporting app 1416 can generate visual interfaces for viewing the search results 1468. The search and reporting app 1416 can, for example, output visual interfaces for the network access application 1406 running on a computing device 1404 to generate.

The visual interfaces can include various visualizations of the search results 1468, such as tables, line or area charts, Choropleth maps, or single values. The search and reporting app 1416 can organize the visualizations into a dashboard, where the dashboard includes a panel for each visualization.

A dashboard can thus include, for example, a panel listing the raw event data for the events in the search results 1468, a panel listing fields extracted at index time and/or found through field discovery along with statistics for those fields, and/or a timeline chart indicating how many events occurred at specific points in time (as indicated by the timestamps associated with each event). In various implementations, the search and reporting app 1416 can provide one or more default dashboards. Alternatively or additionally, the search and reporting app 1416 can include functionality that enables a user to configure custom dashboards.

The search and reporting app 1416 can also enable further investigation into the events in the search results 1416. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1466. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 15:
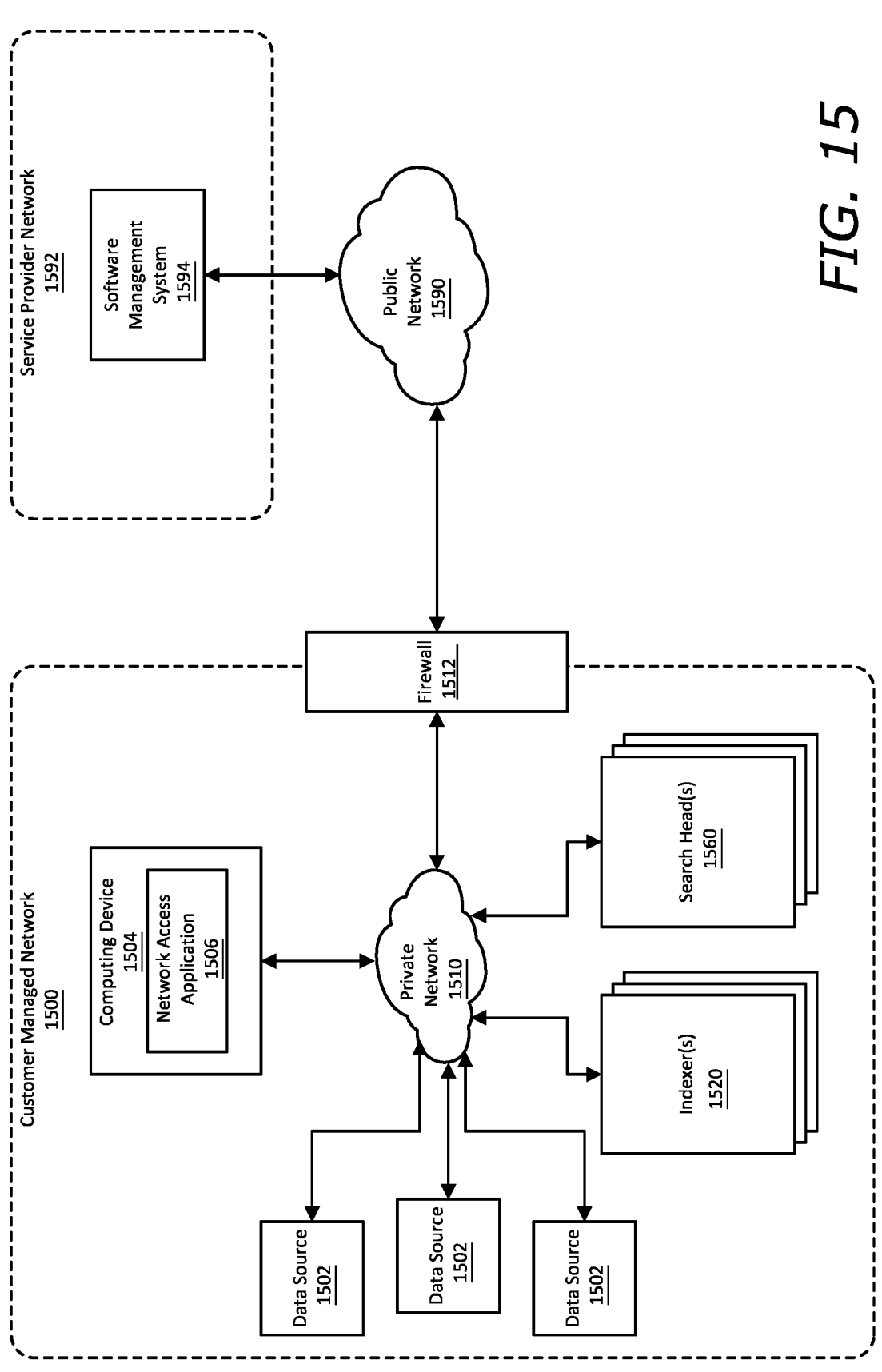
FIG. 15 illustrates an example of a self-managed network 1500 that includes a data intake and query system according to an implementation of the disclosure.

FIG. 15 illustrates an example of a self-managed network 1500 that includes a data intake and query system. "Self-managed" in this instance means that the entity that is operating the self-managed network 1500 configures, administers, maintains, and/or operates the data intake and query system using its own compute resources and people. Further, the self-managed network 1500 of this example is part of the entity's on-premise network and comprises a set of compute, memory, and networking resources that are located, for example, within the confines of a entity's data center. These resources can include software and hardware resources. The entity can, for example, be a company or enterprise, a school, government entity, or other entity. Since the self-managed network 1500 is located within the customer's on-prem environment, such as in the entity's data center, the operation and management of the self-managed network 1500, including of the resources in the self-managed network 1500, is under the control of the entity. For example, administrative personnel of the entity have complete access to and control over the configuration, management, and security of the self-managed network 1500 and its resources.

The self-managed network 1500 can execute one or more instances of the data intake and query system. An instance of the data intake and query system may be executed by one or more computing devices that are part of the self-managed network 1500. A data intake and query system instance can comprise an indexing system and a search system, where the indexing system includes one or more indexers 1520 and the search system includes one or more search heads 1560.

As depicted in FIG. 15, the self-managed network 1500 can include one or more data sources 1502. Data received from these data sources may be processed by an instance of the data intake and query system within self-managed network 1500. The data sources 1502 and the data intake and query system instance can be communicatively coupled to each other via a private network 1510.

Users associated with the entity can interact with and avail themselves of the functions performed by a data intake and query system instance using computing devices. As depicted in FIG. 15, a computing device 1504 can execute a network access application 1506 (e.g., a web browser), that can communicate with the data intake and query system instance and with data sources 1502 via the private network 1510. Using the computing device 1504, a user can perform various operations with respect to the data intake and query system, such as management and administration of the data intake and query system, generation of knowledge objects, and other functions. Results generated from processing performed by the data intake and query system instance may be communicated to the computing device 1504 and output to the user via an output system (e.g., a screen) of the computing device 1504.

The self-managed network 1500 can also be connected to other networks that are outside the entity's on-premise environment/network, such as networks outside the entity's data center. Connectivity to these other external networks is controlled and regulated through one or more layers of security provided by the self-managed network 1500. One or more of these security layers can be implemented using firewalls 1512. The firewalls 1512 form a layer of security around the self-managed network 1500 and regulate the transmission of traffic from the self-managed network 1500 to the other networks and from these other networks to the self-managed network 1500.

Networks external to the self-managed network can include various types of networks including public networks 1590, other private networks, and/or cloud networks provided by one or more cloud service providers. An example of a public network 1590 is the Internet. In the example depicted in FIG. 15, the self-managed network 1500 is connected to a service provider network 1592 provided by a cloud service provider via the public network 1590.

In some implementations, resources provided by a cloud service provider may be used to facilitate the configuration and management of resources within the self-managed network 1500. For example, configuration and management of a data intake and query system instance in the self-managed network 1500 may be facilitated by a software management system 1594 operating in the service provider network 1592. There are various ways in which the software management system 1594 can facilitate the configuration and management of a data intake and query system instance within the self-managed network 1500. As one example, the software management system 1594 may facilitate the download of software including software updates for the data intake and query system. In this example, the software management system 1594 may store information indicative of the versions of the various data intake and query system instances present in the self-managed network 1500. When a software patch or upgrade is available for an instance, the software management system 1594 may inform the self-managed network 1500 of the patch or upgrade. This can be done via messages communicated from the software management system 1594 to the self-managed network 1500.

The software management system 1594 may also provide simplified ways for the patches and/or upgrades to be downloaded and applied to the self-managed network 1500. For example, a message communicated from the software management system 1594 to the self-managed network 1500 regarding a software upgrade may include a Uniform Resource Identifier (URI) that can be used by a system administrator of the self-managed network 1500 to download the upgrade to the self-managed network 1500. In this manner, management resources provided by a cloud service provider using the service provider network 1592 and which are located outside the self-managed network 1500 can be used to facilitate the configuration and management of one or more resources within the entity's on-prem environment. In some implementations, the download of the upgrades and patches may be automated, whereby the software management system 1594 is authorized to, upon determining that a patch is applicable to a data intake and query system instance inside the self-managed network 1500, automatically communicate the upgrade or patch to self-managed network 1500 and cause it to be installed within self-managed network 1500.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

The invention claimed is:

1. A computer-implemented method, comprising:
   obtaining an email object to be classified as phishing or non-phishing;
   generating a token sequence by tokenizing a text portion of the email object;
   deploying a machine learning model with the token sequence as input to the machine learning model resulting in a contextualized embedding sequence, wherein the contextualized embedding sequence is formed of a plurality of contextualized embedding vectors;
   reducing a dimension of a first contextualized embedding vector of the plurality of contextualized embedding vectors with a multi-layer transformer encoder including a plurality of linear layers resulting in a low-dimensionality vector, including a first linear layer configured to reduce the dimension of the first contextualized embedding vector from a first dimensionality to a second dimensionality, and a second linear layer configured to further reduce the dimension of the first contextualized embedding vector from the second dimensionality to a third dimensionality resulting in the low-dimensionality vector having two-dimensions;
   applying an activation function to the low-dimensionality vector resulting in a classification prediction of phishing or non-phishing; and
   responsive to the classification prediction being phishing indicating the email object is to be classified as phishing, causing one or more remediation or preventive efforts.

2. The computer-implemented method of claim 1, wherein the machine learning model is constructed with a multi-layer transformer encoder architecture comprising a plurality of transformer blocks.

3. The computer-implemented method of claim 1, wherein the first linear layer is configured to reduce the dimension of the first contextualized embedding vector from 768-dimensions to 512-dimensions, and wherein the second linear layer is configured to further reduce the dimension of the first contextualized embedding vector from 512-dimensions to 2-dimensions resulting in the low-dimensionality vector.

4. The computer-implemented method of claim 1, wherein the email object includes components of an email including a recipient email address, a sender email address, a subject line, and a text body.

5. The computer-implemented method of claim 4, wherein the email object further includes an attachment to the email.

6. The computer-implemented method of claim 1, further comprising:

extracting phishing-related features from the email object; and prior to reducing the dimension of the first contextualized embedding vector, concatenating the phishing-related features to the first contextualized embedding vector.

7. The computer-implemented method of claim 1, wherein obtaining the email object includes executing a search query to retrieve the email object as one of a batch of email objects.

8. A computing device, comprising:

a processor; and a non-transitory computer-readable medium having stored thereon instructions that, when executed by the processor, cause the processor to perform operations including:

obtaining an email object to be classified as phishing or non-phishing;

generating a token sequence by tokenizing a text portion of the email object;

deploying a machine learning model with the token sequence as input to the machine learning model resulting in a contextualized embedding sequence, wherein the contextualized embedding sequence is formed of a plurality of contextualized embedding vectors;

reducing a dimension of a first contextualized embedding vector of the plurality of contextualized embedding vectors with a multi-layer transformer encoder including a plurality of linear layers resulting in a low-dimensionality vector, including a first linear layer configured to reduce the dimension of the first contextualized embedding vector from a first dimensionality to a second dimensionality, and a second linear layer configured to further reduce the dimension of the first contextualized embedding vector from the second dimensionality to a third dimensionality resulting in the low-dimensionality vector having two-dimensions;

applying an activation function to the low-dimensionality vector resulting in a classification prediction of phishing or non-phishing; and responsive to the classification prediction being phishing indicating the email object is to be classified as phishing, causing one or more remediation or preventive efforts.

9. The computing device of claim 8, wherein the machine learning model is constructed with a multi-layer transformer encoder architecture comprising a plurality of transformer blocks.

10. The computing device of claim 8, wherein the first linear layer is configured to reduce the dimension of the first contextualized embedding vector from 768-dimensions to 512-dimensions, and wherein the second linear layer is configured to further reduce the dimension of the first contextualized embedding vector from 512-dimensions to 2-dimensions resulting in the low-dimensionality vector.

11. The computing device of claim 8, wherein the email object includes components of an email including a recipient email address, a sender email address, a subject line, and a text body.

12. The computing device of claim 11, wherein the email object further includes an attachment to the email.

13. The computing device of claim 8, wherein the operations further include:

extracting phishing-related features from the email object; and prior to reducing the dimension of the first contextualized embedding vector, concatenating the phishing-related features to the first contextualized embedding vector.

14. The computing device of claim 8, wherein obtaining the email object includes executing a search query to retrieve the email object as one of a batch of email objects.

15. A non-transitory computer-readable medium having stored thereon instructions that, when executed by one or more processors, cause the one or more processor to perform operations including:

obtaining an email object to be classified as phishing or non-phishing;

generating a token sequence by tokenizing a text portion of the email object;

deploying a machine learning model with the token sequence as input to the machine learning model resulting in a contextualized embedding sequence, wherein the contextualized embedding sequence is formed of a plurality of contextualized embedding vectors;

reducing a dimension of a first contextualized embedding vector of the plurality of contextualized embedding vectors with a multi-layer transformer encoder including a plurality of linear layers resulting in a low-dimensionality vector, including a first linear layer configured to reduce the dimension of the first contextualized embedding vector from a first dimensionality to a second dimensionality, and a second linear layer configured to further reduce the dimension of the first contextualized embedding vector from the second dimensionality to a third dimensionality resulting in the low-dimensionality vector having two-dimensions;

applying an activation function to the low-dimensionality vector resulting in a classification prediction of phishing or non-phishing; and responsive to the classification prediction being phishing indicating the email object is to be classified as phishing, causing one or more remediation or preventive efforts.

16. The non-transitory computer-readable medium of claim 15, wherein the machine learning model is constructed with a multi-layer transformer encoder architecture comprising a plurality of transformer blocks.

17. The non-transitory computer-readable medium of claim 15, wherein the first linear layer is configured to reduce the dimension of the first contextualized embedding vector from 768-dimensions to 512-dimensions, and wherein the second linear layer is configured to further reduce the dimension of the first contextualized embedding vector from 512-dimensions to 2-dimensions resulting in the low-dimensionality vector.

18. The non-transitory computer-readable medium of claim 15, wherein an email object includes components of an email including a recipient email address, a sender email address, a subject line, a text body.

19. The non-transitory computer-readable medium of claim 15, wherein the operations further include:

extracting phishing-related features from the email object; and prior to reducing the dimension of the first contextualized embedding vector, concatenating the phishing-related features to the first contextualized embedding vector.

20. The non-transitory computer-readable medium of claim 15, wherein obtaining the email object includes executing a search query to retrieve the email object as one of a batch of email objects.

* * * * *